Dec. 29, 1959 S. SHARIN ET AL 2,919,306

CONTROL CIRCUIT

Filed March 21, 1957 6 Sheets-Sheet 1

INVENTORS
SAMUEL SHARIN
HAJIME J. KISHI
THOMAS R. SHERIDAN &
ANTHONY LIGUORI

BY Charles H. Brown
ATTORNEY

CONTROL CIRCUIT

Filed March 21, 1957 6 Sheets-Sheet 2

CODE

| | | | |
|---|---|---|---|
| FIG. 2a. | FIG. 2b. | FIG. 2c. | FIG. 2d. |

INVENTORS
SAMUEL SHARIN
HAJIME J. KISHI
THOMAS R. SHERIDAN &
ANTHONY LIGUORI
BY Charles H. Brown
ATTORNEY

CONTROL CIRCUIT

Filed March 21, 1957 6 Sheets-Sheet 3

INVENTORS
SAMUEL SHARIN
HAJIME J. KISHI
THOMAS R. SHERIDAN &
ANTHONY LIGUORI
BY Charles H. Brown
ATTORNEY INVENTORS
SAMUEL SHARIN
HAJIME J. KISHI
THOMAS R. SHERIDAN &
ANTHONY LIGUORI
BY Charles H. Brown
ATTORNEY INVENTORS
SAMUEL SHARIN
HAJIME J. KISHI
THOMAS R. SHERIDAN &
ANTHONY LIGUORI
BY Charles H. Brown
ATTORNEY Dec. 29, 1959 S. SHARIN ET AL 2,919,306

CONTROL CIRCUIT

Filed March 21, 1957 6 Sheets-Sheet 6

INVENTORS
SAMUEL SHARIN
HAJIME J. KISHI
THOMAS R. SHERIDAN &
ANTHONY LIGUORI

BY Charles H. Brown
ATTORNEY 2,919,306

CONTROL CIRCUIT

Samuel Sharin, Brooklyn, Hajime J. Kishi, Huntington, Thomas R. Sheridan, Brooklyn, and Anthony Liguori, Huntington Station, N.Y., assignors to Radio Corporation of America, a corporation of Delaware Application March 21, 1957, Serial No. 647,561

20 Claims. (Cl. 178—26)

Figure 1:
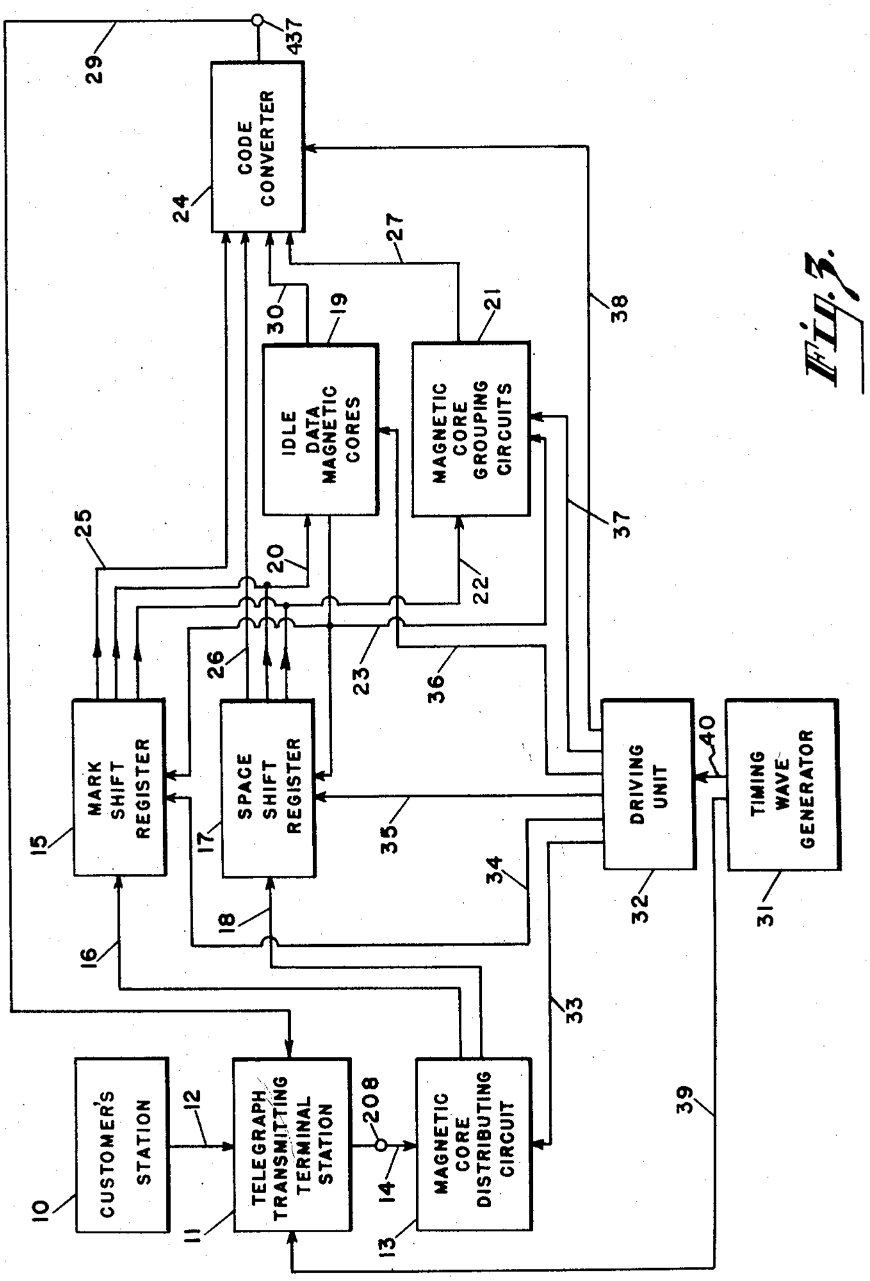

The invention relates to control circuits and, particularly, to a code converting circuit which uses magnetic cores and can be adapted for use in a telegraph communication system.

Telegraph transmitting and receiving devices are designed for the most part to use the code characters of a standard fixed-length telegraph code, for example, the five-unit, fixed-length telegraph code. Each code character of the five-unit telegraph code includes an arrangement of marking and spacing elements. A code character may include five marking elements, five spacing elements or a combination of marking and spacing elements arranged in a predetermined manner. Marking elements are generally defined as intervals of current flow, while spacing elements are generally defined as intervals of no current flow. In the transmission of a telegraph message signal between remotely located telegraph terminal stations using such a telegraph code, for example, by means of a radio frequency transmission system, marking elements included in a code character may be deleted by atmospheric conditions, while spacing elements may be filled in by noise, and so on. As the ratio of marking elements to spacing elements is not the same in each character of the five-unit telegraph code, it is difficult to design equipment for detecting an erroneous code character which has been distorted during the transmission thereof and, thereafter, placing the necessary correcting equipment in operation.

Various telegraph codes known in the art as protected telegraph codes have been developed to avoid this difficulty. The marking and spacing elements in the code characters of a protected telegraph code are arranged such that a code character which has been distorted during the transmission thereof can be readily detected. For example, the code characters of a seven-unit, fixed-length protected telegraph code used widely in the communication art each include a ratio of three marking elements to four spacing elements. A distorted code character includinng more than or less than three marking elements can be detected by providing equipment for counting the marking elements in each code character as it is received.

In the use of a protected telegraph code, code characters are first produced by a telegraph transmitting device using the standard telegraph code. Equipment including a code converting circuit is provided at a telegraph transmitting terminal station for converting the code characters of the standard telegraph code into the corresponding code characters of the protected telegraph code and for transmitting the converted code characters to a telegraph receiving terminal station. Equipment is provided at the receiving terminal station for converting the received code characters into the corresponding code characters of the standard telegraph code and for distributing the code characters of the standard telegraph code to a telegraph receiving device. If a distorted code character of the protected telegraph code is detected, a predetermined error designating character may be printed on the receiving device or the necessary equipment may be placed in operation to cause the retransmission by the transmitting terminal station of the code character received distorted. Circuits for converting the code characters of a standard telegraph code into the corresponding code characters of a protected telegraph code are presently available. Both electronic and mechanical circuits are known. The mechanical circuits require the use of priming windings, relays, and so on, and are not completely satisfactory because they create difficult mechanical maintenance problems. Such circuits tend to be complicated in construction and operation. The electronic circuits presently available require a number of vacuum tubes. While some of the problems encountered in using the mechanical circuits are eliminated by the use of the electronic circuits, the number of vacuum tubes needed in the electronic circuits now available presents the problem of heat dissipation and makes the circuits expensive to construct and maintain in terms of components and power consumption. Because of the number of vacuum tubes needed, the electronic circuits tend to be bulky and awkward to handle, thereby adding to the problems encountered in designing equipment including a code converting circuit of this construction.

It is an object of the invention to provide an improved circuit arrangement for converting code characters of a given telegraph code into the corresponding code characters of a different telegraph code.

Another object is to provide an improved telegraph code converting circuit including magnetic cores to perform functions heretofore performed by other equipment, and which is faster in operation and more compact in construction than the code converting circuits now known.

A further object is to obtain a new and novel circuit arrangement using magnetic cores for converting code characters having a fixed number of signal elements into corresponding code characters having a larger, fixed number of signal elements.

The objects of the invention are accomplished by a circuit arrangement including a number of single magnetic core circuits and a number of magnetic core shift registers. Each of the shift registers includes a number of magnetic cores connected to form a chain or train of magnetic cores in a manner known in the art. In describing the invention, it will be assumed that the circuit of the invention is required to convert the code characters of the five-unit telegraph code into the corresponding code characters of a seven-unit protected telegraph code.

A telegraph communication system generally includes at least a telegraph transmitting terminal station and a remotely located telegraph receiving terminal station. Either a land line or radio frequency transmission system is used to provide a connection between the transmitting terminal station and the receiving terminal station. A message signal including code characters of the five-unit telegraph code may originate at any one of a number of customer's stations. The message signal is fed from the customer's station to the transmitting terminal station and forwarded by the transmitting terminal station using code characters of a seven-unit protected telegraph code to the receiving terminal station over the transmission path provided therebetween. The receiving terminal station functions, in turn, to convert the received code characters into the corresponding code characters of the five-unit telegraph code and to distribute the code characters to a proper customer's station connected thereto. The communication system operates in this manner to complete an electrical circuit over which a message signal can be sent from one customer's station to another.

One of a number of possible traffic conditions can exist in the operation of such a communication system. A customer's station may be connected to the transmitting terminal station. The operating time of the communication system is made available to the customer's station and is not, therefore, available for use by another customer's station at the transmitting end. If the customer's station is not using the operating time of the communication system to transmit a message signal, an idle-beta condition is said to exist. If, however, the customer's station is in the process of transmitting a message signal to a customer's station at the receiving end, the communication system is not idle and a no-idle condition exists. When a customer's station is not connected to the transmitting terminal station, an idle-alpha condition is said to exist. Since the operating time is not being used by a customer's station, the transmitting terminal station may be operated to first produce a message signal using the code characters of the five-unit telegraph code and to thereafter transmit the message signal to the receiving terminal station using code characters of the seven-unit protected telegraph code. The message signal may include service instructions, test signals, and so on. A no-idle condition exists since the operating time is in use by the transmitting terminal station.

In any of the conditions just described, signal characters are made available at the transmitting terminal station each including information as to the traffic condition of the communication system. When a message signal is available for transmission, each signal character also includes the signal elements of a five-unit telegraph code character included in the message signal. In one known arrangement, signal characters each including seven-units are made available at the transmitting terminal station. The first unit is used to indicate whether an alpha or beta condition exists. That is to say, whether or not a customer's station is connected to the transmitting terminal station. The second unit indicates whether an idle or no-idle condition exists. If a message signal is available for transmission by either the transmitting terminal station or by a customer's station, the remaining five-units will correspond to the signal elements of a five-unit telegraph code character in the message signal.

The code converting circuit of the invention can be adapted for use in connection with a transmitting terminal station of the type described. The seven-unit signal characters available at the transmitting terminal station are applied to the code converting circuit. The code converting circuit includes magnetic core circuitry which functions to bring about the conversion of each of the signal characters applied thereto into a corresponding code character of a seven-unit protected telegraph code. If no message signals are available for transmission, the signal characters applied to the code converting circuit will each include either idle-alpha or idle-beta information. The signal characters are in each case converted by the code converting circuit into predetermined code characters of the seven-unit protected telegraph code. If a message signal is being transmitted such that a no-idle condition exists, the code converting circuit functions to convert the five-unit telegraph code characters into the corresponding code characters of the seven-unit protected telegraph code. The converted code characters are applied from the output of the code converting circuit back to the transmitting terminal station for transmission to the receiving terminal station. By using magnetic cores to perform functions previously performed by other equipment, a code converting circuit is obtained which is more compact in construction and faster in operation than code converting circuits presently available in the art.

Figure 3:
Figure 2A:
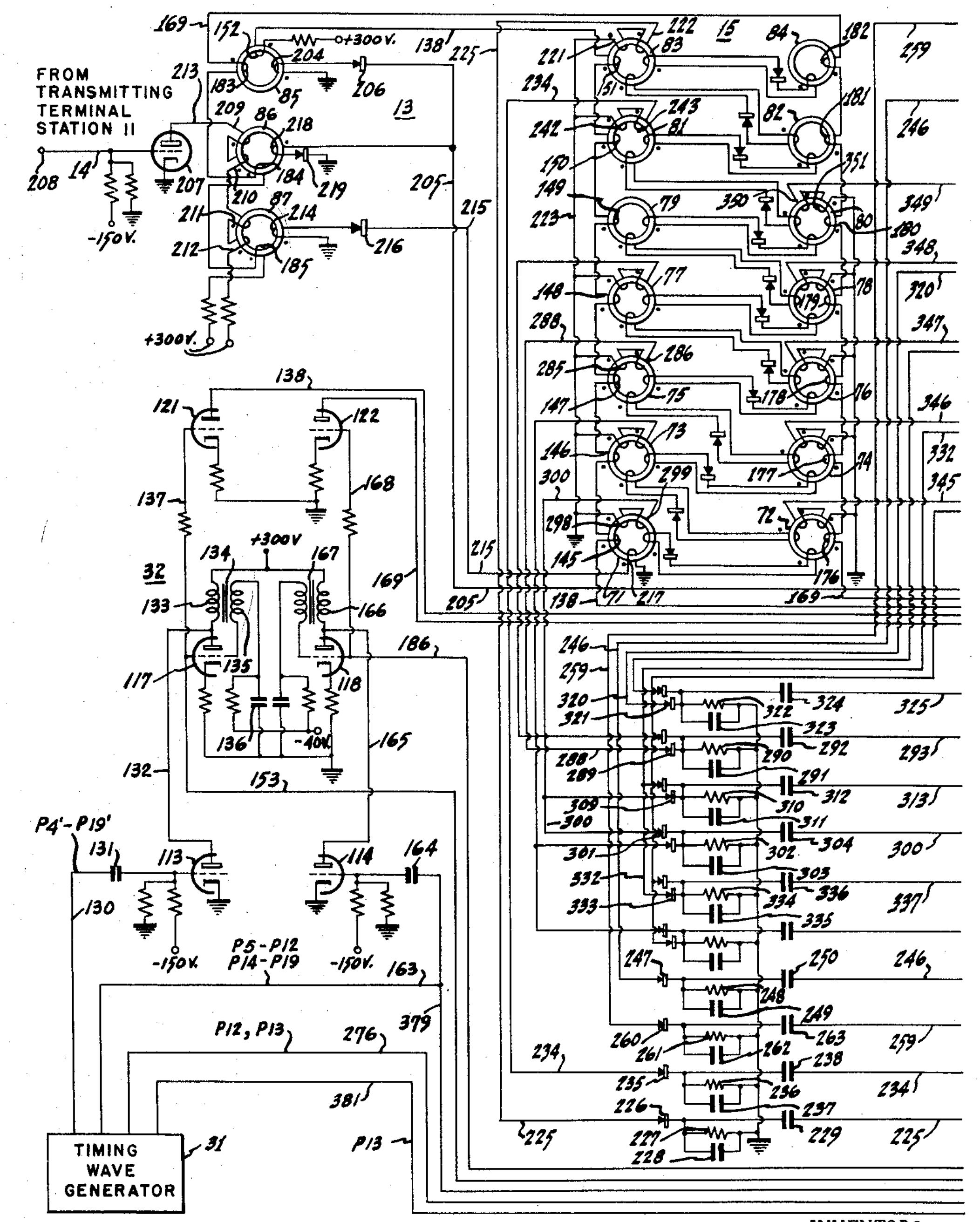
Figure 2B:
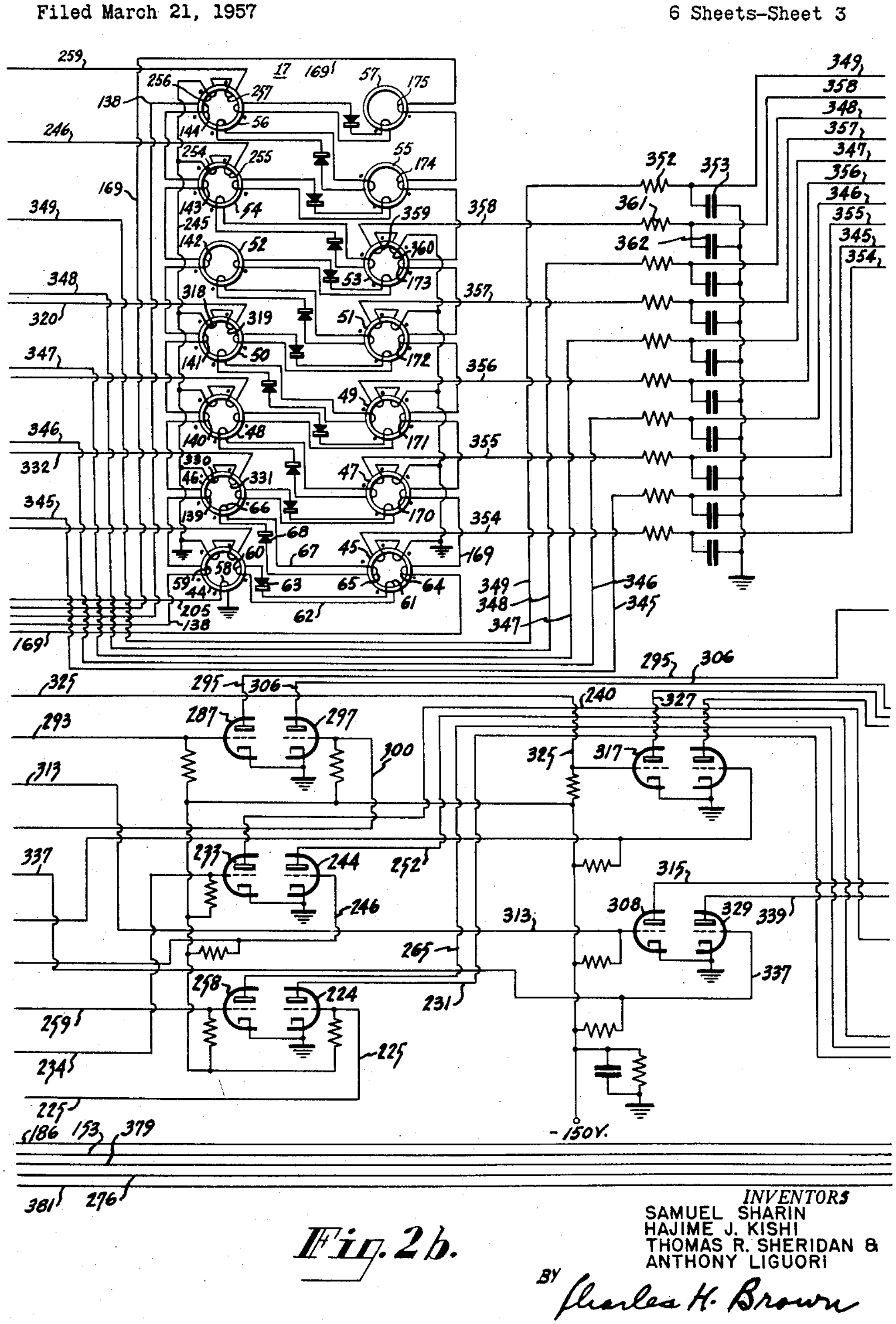
Figure 2C:
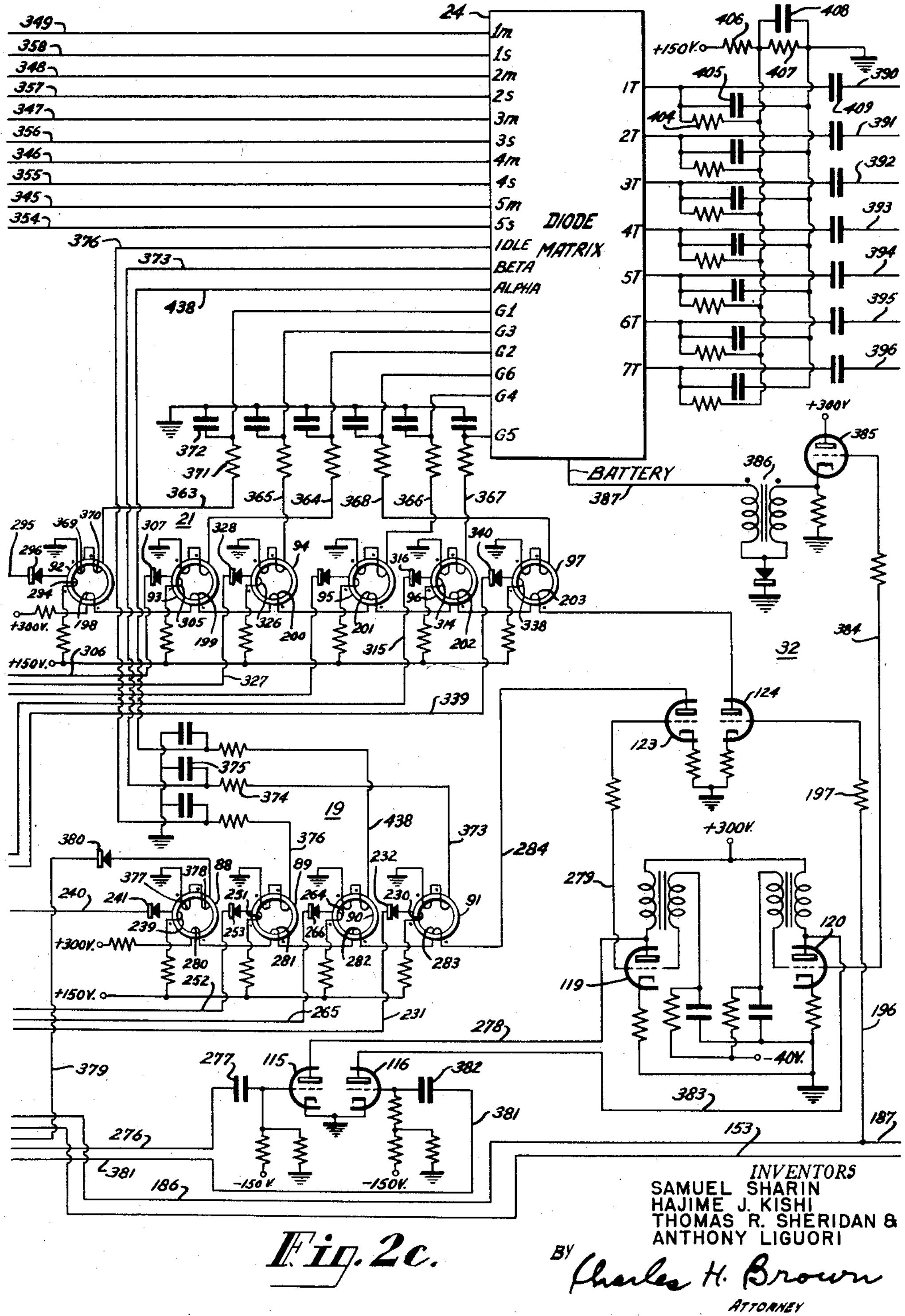
Figure 2D:
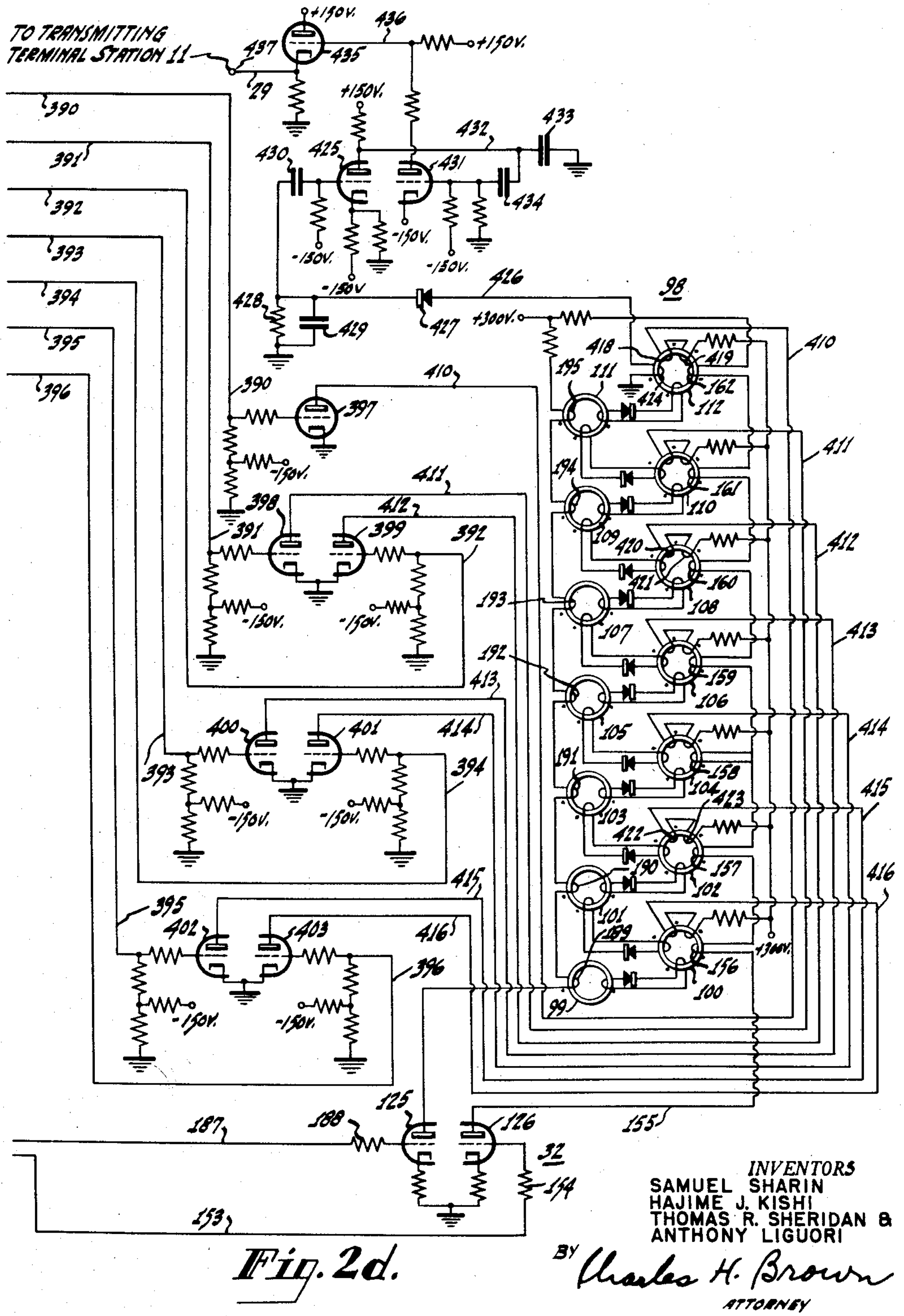
Figure 4:
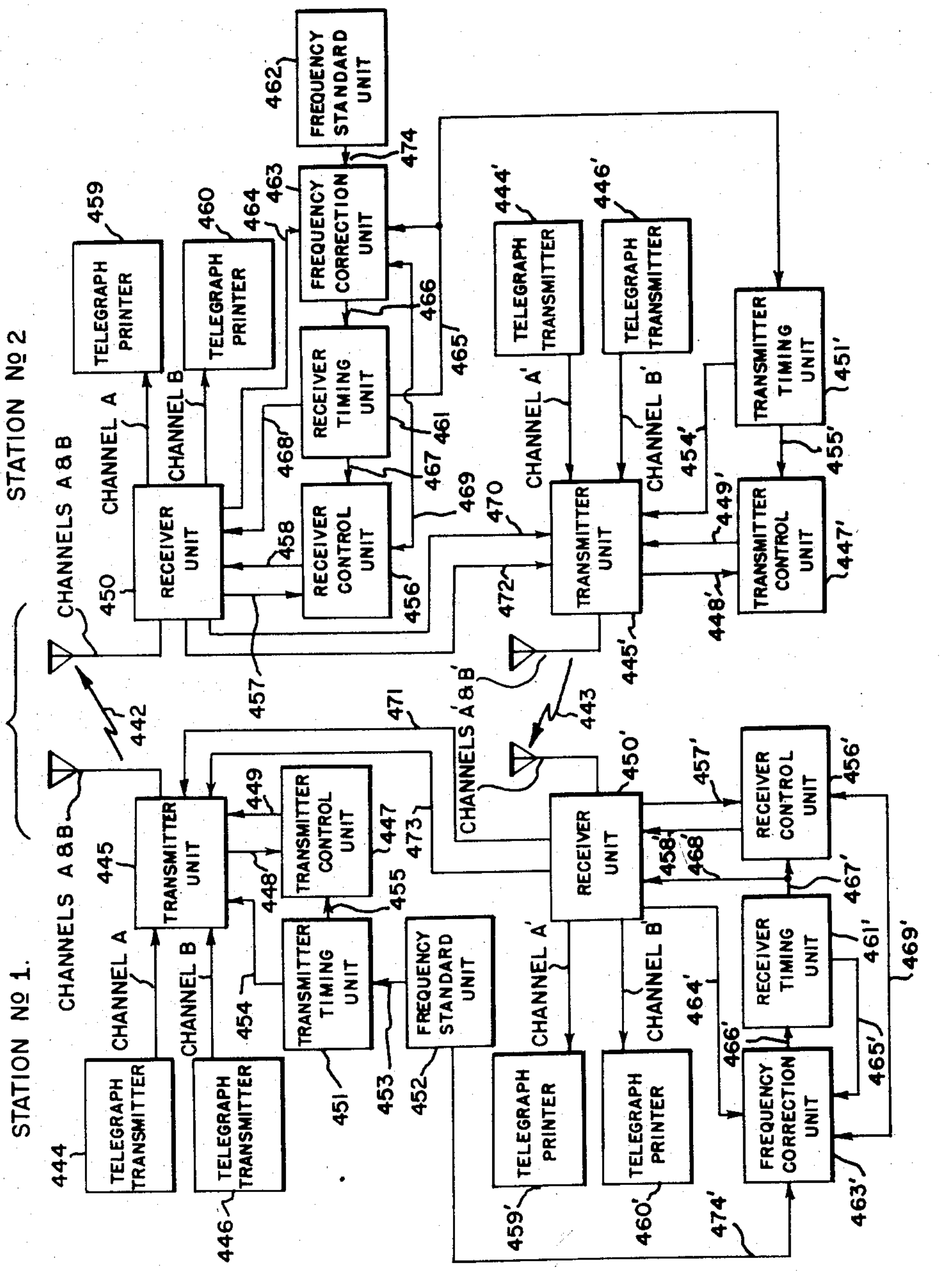

A more detailed description of the invention follows with reference to the accompanying drawing, in which;

Figure 1 is a block diagram of one embodiment of a code converting circuit according to the invention;

Figure 2, Figures 2*a*, 2*b*, 2*c* and 2*d* taken together, is a circuit diagram of a code converting circuit constructed according to the arrangement of the invention shown by way of example in the block diagram of Figure 1;

Figure 3 is a timing diagram used in explaining the operation of the circuit diagram shown in Figure 2; and Figure 4 is a block diagram of an automatic telegraph communication system in which the code converting circuit of the invention may find application.

Referring to the block diagram given in Figure 1, a customer's station 10 and a telegraph transmitting terminal station 11 are shown. For simplicity of description, only one customer's station 10 is shown and will be described. However, it is understood that in actual practice a number of similar customer's stations will be arranged for connection to the transmitting terminal station 11. In addition to receiving, transmitting and control equipment, the transmitting terminal station 11 includes the usual manual or automatic operator's position. The operator's position includes suitable switchboard equipment and so on for completing a connection between the customer's station 10 and the transmitting terminal station 11. When a message signal including code characters of the five-unit telegraph code originates at the customer's station 10, the necessary connection is completed at the operator's position and the message signal is applied from the customer's station 10 to the transmitting terminal station 11 over lead 12.

As is conventional in the use of a five-unit telegraph code, each code character includes in practice six units or elements in that a start element precedes each group of five signal elements of a code character included in the message signal. The transmitting terminal station 11 functions to produce a signal character upon the reception of each code character in the message signal. Each signal character so produced includes five units corresponding to the five signal elements of a code character included in the message signal and a sixth element or no-idle element which is marking in nature and corresponds to the start element included in the received five-unit telegraph code character. In addition, the transmitting terminal station 11 functions to add a seventh element or bit of information to the signal character. The nature of the seventh element is determined according to whether or not the customer's station 10 is connected to the transmitting terminal station 11. If such a connection is completed, the seventh element is marking in nature and is designated as beta. If not, the seventh element is spacing in nature and is designated as alpha. Since it is assumed that a message signal is originating at the customer's station 10, each seven-unit signal character made available at the transmitting terminal station 11 includes no-idle and beta information elements in addition to the five signal elements of a code character included in the message signal. The seven units of each signal character are applied in series from the transmitting terminal station 11 to a distributing circuit 13 over a lead 14.

The distributing circuit 13 is included in the code converting circuit according to the invention and includes a number of magnetic cores. The magnetic cores in the distributing circuit 13 function to distribute the signal elements in each seven-unit signal character applied thereto to a mark shift register 15 over lead 16 and to a space shift register 17 over a lead 18. Both the mark shift register 15 and the space shift register 17 include a chain or train of magnetic cores interconnected to form a magnetic core shift register. The operation and construction of magnetic cores and of magnetic core shift registers, per se, is known in the art and, therefore, a detailed description thereof is unnecessary. A magnetic core is a circuit element having a rectangular hysteresis loop of low coercive force. Certain materials such as molybdenum-permalloy and manganese-magnesium ferrite exhibit a substantial rectangular hysteresis loop. Input, output and shift windings are arranged on the core. A magnetic core is capable of being magnetized to saturation in either one of two directions. In one direction, a positive or active state is said to arise in which the direction of retentivity is opposite to that which would result from the application of a shift current or sensing pulse to the shift winding of the core. In the second direction, a negative or inactive state is said to arise in which the direction of retentivity is the same as that which would result from the application of a shift current pulse to the shift winding on the core. When applied to a magnetic core in the active state, a shift current pulse will cause the inactive state to appear. When applied to a magnetic core already in the inactive state, a shift current pulse will cause no change in state. A magnetic core in the active or positive state is said to contain a "one," and a magnetic core in the negative or inactive state is said to contain a "zero." When a magnetic core is shifted from an active state to an inactive state, a voltage is induced in the output winding and a current pulse is produced for application to a utilization circuit connected thereto. A shift current pulse will have no substantial effect on a magnetic core in the inactive state, and substantially no voltage will be induced in its output winding.

If a "one" is stored in a first magnetic core in a chain of magnetic cores included in a shift register such that the core is in an active state, the application of a shift current pulse to the shift winding on the core causes a voltage to be induced in the output winding on the core. The output winding on the first magnetic core is connected to the input winding on a succeeding magnetic core in the chain. The voltage induced in the output winding on the first magnetic core results in a current flow through the input winding on the next magnetic core in the chain in the proper polarity to cause a "one" to be stored in the next magnetic core. Thus, the "one" is transferred from the first magnetic core to a second magnetic core included in the shift register. Additional shift current pulses can be selectively applied to the magnetic cores in the chain of magnetic cores to cause the "one" to advance core-by-core along the chain of magnetic cores included in the shift register. As a result of the actions outlined above, a single magnetic core, as well as a magnetic core shift register, can be adapted to perform various functions.

The seven units in each signal character are applied in series from the transmitting terminal station 11 to the distributing circuit 13 over lead 14. The magnetic cores in the distributing circuit 13 function in response to each marking unit or element in a received signal character to apply a control pulse to the mark shift register 15 over lead 16. As a result of this action, a "one" is stored in certain of the magnetic cores included in the mark shift register 15 according to the order in which the marking elements appear in the received signal character. Upon the reception of each spacing unit or element in the received signal character, a control pulse is applied from the distributing circuit 13 to the space shift register 17 over lead 18. A "one" is stored in certain of the magnetic cores included in the space shift register 17 according to the order in which the spacing elements appear in the received signal character. Upon the reception by the distributing circuit 13 of a complete seven-unit signal character, the received signal character will be stored in one sense in the mark shift register 15 and in the opposite sense in the space shift register 17. The received signal character is said to be stored in a binary form in the two shift registers 15 and 17.

Character information corresponding to the arrangement of the signal elements in a five-unit telegraph code character and traffic information determined by the no-idle and beta information elements are stored in the mark and space shift registers 15 and 17 upon the reception of each complete seven-unit signal character by the distributing circuit 13. The mark and space shift registers 15 and 17 are operated after the reception of each signal character to produce output signals according to the traffic information stored therein and to apply the output signals so produced to a group of idle data magnetic cores 19 over a lead 20. At the same time, a given number of output signals are produced by the mark and space shift registers 15 and 17 according to the character information stored therein and are applied to magnetic core grouping circuits 21 over a lead 22. The magnetic core grouping circuits 21 are each responsive to predetermined ones of the output signals applied thereto and function to store information representing the presence and absence of the predetermined output signals.

It has been assumed in the discussion so far that the customer's station 10 is in the process of transmitting a message signal. A no-idle traffic condition exists. Traffic information corresponding to this condition will be stored in the mark and space shift registers 15 and 17. The idle data magnetic cores 19 are responsive to the output signals produced by the mark and space shift registers 15 and 17 when information corresponding to a no-idle traffic condition is stored therein to produce a control pulse which is applied to the mark shift register 15, space shift register 17 and the magnetic core grouping circuits 21 over a lead 23. The mark and space shift registers 15 and 17 function in response to the control pulse to apply the character information stored therein to a code converter 24 over leads 25 and 26, respectively, in the form of output signals. Simultaneously, the magnetic core grouping circuits 21 are operated in response to the control pulse to apply the information stored therein to the code converter 24 over a lead 27 in the form of output signals. The code converter 24 includes, for example, a diode matrix which is designed to produce a seven-unit telegraph code character of a protected telegraph code in response to the output signals applied thereto from the mark and space shift registers 15 and 17 and from the grouping circuits 21. In this manner, each five-unit telegraph code character received by the distributing circuit 13 and stored in binary form in the mark and space shift registers 15 and 17 is converted into a seven-unit telegraph code character of a protected telegraph code. The converted code characters are applied from the code converter 24 to the transmitting terminal station 11 over a lead 29. The transmitting terminal station 11 includes equipment arranged to transmit the converted code characters to a remote receiving terminal station over a suitable transmission path provided between the transmitting terminal station 11 and the receiving terminal station, not shown.

While it was assumed above that the customer's station 10 was in the process of transmitting a message signal, the operation of the code converting circuit is the same should a message signal originate instead at the transmitting terminal station 11. In either case, a no-idle traffic condition exists such that the idle-data magnetic cores 19 are operated to supply a control pulse to the mark and space shift registers 15 and 17 and to the magnetic core grouping circuits 21. The character information stored in the mark and space shift registers 15 and 17 is applied to the code converter 24, as is the information stored in the magnetic core grouping circuits 21. The five-unit telegraph code characters included in the message signal originating at the transmitting terminal station 11 are each, in turn, converted into the corresponding seven-unit telegraph code characters of the protected telegraph code and fed back to the transmitting terminal station 11 via lead 29 for transmission to the receiving terminal station.

Instead of a no-idle traffic condition in which either the customer's station 10 or the transmitting terminal station 11 is in the process of transmitting a message signal, an idle traffic condition may exist. The customer's station 10 may be connected through the operator's position to the transmitting terminal station 11. The operating time of the communication system of which the transmitting terminal station 11 is a part is made available to the customer's station 10. Although the connection is completed, the customer's station 10 may not be using the operating time to transmit a message signal. An idle-beta traffic condition exists. On the other hand, the customer's station 10 may not be connected through the operator's position to the transmitting terminal station 11, and the transmitting terminal station 11 may not require the available operating time to transmit a message signal. An idle-alpha traffic condition exists. The signal characters applied to the distributing circuit 13 will each include a spacing element corresponding to the absence of a start element, indicating an idle condition, and the element, either alpha or beta, added to each signal character by the operation of the transmitting terminal station 11. The traffic information stored in the mark and space shift registers 15 and 17 following the reception by the distributing circuit 13 of each signal character will correspond to the particular idle condition of the communication system.

After each signal character is received by the distributing circuit 13 and the idle traffic information stored in the mark and space shift registers 15 and 17, the mark and space shift registers 15 and 17 are operated to apply an output signal to the idle data magnetic cores 19 over lead 20. Either an idle-alpha or an idle-beta signal will be applied to the idle data magnetic cores 19. If an idle-alpha signal is applied to the idle data magnetic cores 19, the idle data magnetic cores 19 function to apply the proper output signals to the code converter 24 over a lead 30 to cause the code converter 24 to produce a predetermined seven-unit telegraph code character of the protected telegraph code. Should an idle-beta signal be received, the idle data magnetic cores 19 function to apply the proper output signals to the code converter 24 over lead 30 to cause the code converter 24 to produce a different predetermined seven-unit telegraph code character of the protected telegraph code. The predetermined code characters are in each case applied from the output of the code converter 24 to the transmitting terminal station 11 via lead 29 for transmission to the receiving terminal station, not shown, which is connected to the transmitting terminal station 11 by a suitable transmission system.

The functioning of the various circuit components in the code converting circuit in the manner outlined above is controlled by timing pulses supplied by a timing wave generator 31. Timing pulses produced by the timing wave generator 31 are applied to a driving unit 32 over a lead 40. The driving unit 32 functions to supply the timing pulses in the proper sequence and at the desired rates of frequency to the distributing circuit 13, mark shift register 15, space shift register 17, idle data magnetic cores 19, magnetic core grouping circuits 21 and the code converter 24 over leads 33 through 38, respectively. The circuit components are operated in the proper timed sequence by the timing pulses to perform the functions described. In order to insure that the circuit components in the code converting circuit are operated synchronously with the transmitting terminal station 11, the operation of the transmitting terminal station 11 may be controlled by timing pulses supplied thereto from the timing wave generator 31 over a lead 39.

A circuit diagram of an embodiment of the invention constructed according to the block diagram given in Figure 1 is shown by way of example only in Figure 2. To assist in an understanding of the invention, voltage values have been assigned to various positive and negative terminals connected to suitable sources of potential and arranged in the circuit diagram. The values, however, are given only by way of example, and can be altered to meet the requirements of a particular application without departing from the spirit of the invention.

The operation of the code converting circuit according to the invention requires two input trains of timing pulses. Referring to Figure 3, the first train of timing pulses includes a series of pulses P5 through P19 shown by the larger arrows. The pulses P5 through P19 occur at regular intervals, for example, at approximately 208 microsecond intervals. The second train of timing pulses includes a series of pulses P4′ through P19′ shown by the smaller arrows. The pulses P4′ through P19′ of the second train are interspersed in time between the pulses P5 through P19 of the first train such that each of the pulses P4′ through P19′ of the second train occurs between succeeding pulses P5 through P19 of the first train. The pulses P4′ through P19′ are taken to be one-half cycle behind the pulses P5 through P19 as a reference. The second train of pulses P4′ through P19′ is continuous throughout the circuit of the invention, while the first train of pulses P5 through P19 is gated to perform the logic of the circuit. The respective trains of timing pulses have been shown for simplicity of drawing and description as being supplied by a timing wave generator 31. In actual practice, one or both of the trains of timing pulses may be supplied as a function of other equipment included at a telegraph terminal station of which the circuit of the invention is a part. One of the trains of pulses may be supplied as a function of a frequency correction unit connected between the timing wave generator 31 and the input circuit of the invention, the frequency correction unit functioning to synchronize the timing pulses supplied by the timing wave generator 31 with the incoming telegraph message signal. An example of a timing wave generator using magnetic cores that can be adapted for use with the code converting circuit of the invention is given in copending United States patent application Serial Number 616,275, filed October 16, 1956 on behalf of H. J. Kishi and T. R. Sheridan for Timing Circuit.

The embodiment of the invention shown in the circuit diagram given in Figure 2 includes a first magnetic core shift register 15 designated as a mark shift register and a second magnetic core shift register 17 designated as a space shift register. The space shift register 17 includes a chain of fourteen magnetic cores 44 through 57 arranged in two rows of seven magnetic cores each. The type of magnetic core shift register shown is generally referred to as a two-core-per-bit shift register. The even numbered magnetic cores constitute a line of storage cores, while the odd numbered magnetic cores constitute a line of temporary storage cores. Input, output and shift windings are arranged on each of the magnetic cores 44 through 57. The relative polarity of the respective windings on each of the magnetic cores in the space shift register 17, as well as on the magnetic cores used elsewhere in the circuit to be described, is indicated by a dot adjacent one of the terminals thereof in accordance with the usual transformer convention.

Assuming for the moment that a current flows through the input winding 58 on the first magnetic core 44 in the space shift register 17, the voltage induced in the input winding 58 causes the magnetic core 44 to assume an active state having a "one" stored therein. If a shift current pulse is thereafter applied to the shift winding 59, a voltage is induced in the output winding 60. The voltage induced in the output winding 60 causes current to flow through the input winding 61 on the next magnetic core 45 in the chain over a connection 62 including a unidirectional impedance device 63, for example, a rectifier. Various other unidirectional impedance devices are used elsewhere in the circuit. The devices are shown in Figure 2 and are identified in the specification as rectifiers. It is to be understood that the embodiment of the invention is not limited to the use of the particular type of device shown but that other devices known in the art which are adapted to pass current therethrough in only one direction may be used without departing from the spirit of the invention. The rectifier 63 is poled in the proper direction to permit the passage of current from the output winding 60 to the input winding 61. The magnetic core 44 assumes an inactive state having a "zero" stored therein. The second magnetic core 45 operates in response to the voltage induced in the input winding 61 to assume an active state having a "one" stored therein. Thus, the "one" is transferred or advanced from the first magnetic core 44 to the second magnetic core 45.

When a shift current pulse is applied to the shift winding 64 on the magnetic core 45, a voltage is induced in the output winding 65. Current is applied from the output winding 65 to the input winding 66 on the third magnetic core 46 in the chain over a connection 67 including a rectifier 68. Magnetic core 45 assumes an inactive state having a "zero" stored therein. The magnetic core 46 operates in response to the voltage induced in the input winding 66 to assume an active state having a "one" stored therein. The "one" is advanced from the second magnetic core 45 to the third magnetic core 46. When the "one" is advanced out of the magnetic core 45, a voltage is also induced in the input winding 61. The rectifier 63 in the connection 62 is, however, poled in the proper direction to prevent current from being applied to the output winding 60 on the magnetic core 44. As a result, the "one" is not fed back from the second magnetic core 45 to the first magnetic core 44.

The remaining magnetic cores in the space shift register 17 are connected together and operate in the same manner as the magnetic cores 44, 45. By first applying a shift current pulse to the shift windings on the even numbered magnetic cores constituting the line of storage cores and then applying a shift current pulse to the shift windings on the odd numbered magnetic cores constituting the line of temporary storage cores, a "one" is advanced from core-to-core along the chain of magnetic cores. The "one" is advanced out of a magnetic core in the line of storage cores and into a magnetic core in the line of temporary storage cores. Upon the application of a shift current pulse to the shift windings on the magnetic cores in the line of temporary storage cores, the "one" is advanced out of the magnetic core in the line of temporary storage cores and into the next magnetic core in the line of storage cores, and so on.

The mark shift register 15 includes a chain of fourteen magnetic cores 71 through 84 arranged in two rows of seven magnetic cores each and is similar in construction and operation to that of the space shift register 17. The odd numbered magnetic cores constitute a line of storage cores, while the even numbered magnetic cores constitute a line of temporary storage cores. A "one" inserted in the first magnetic core 71 is advanced core-by-core along the chain of magnetic cores 71 through 84 in the same manner as described in connection with the space shift register 17.

The distributing circuit 13 includes three single magnetic cores 85 through 87. The magnetic cores 85 through 87 are interconnected such that they function to cause a signal character applied thereto from the transmitting terminal station 11 to be stored in the mark and space shift registers 15 and 17 in binary form. As each signal character is received, both character and traffic information will be stored in the mark and space shift registers 15 and 17. Four single magnetic cores 88 through 91, indicated generally as idle data magnetic cores 19 in Figure 1, are each connected to certain of the magnetic cores in the mark shift register 15 and in the space shift register 17 and are responsive to the traffic information stored therein to perform functions to be described. Six single magnetic cores 92 through 97, indicated generally as magnetic core grouping circuits 21 in Figure 1, are each connected to certain other of the magnetic cores in the mark shift register 15 and in the space shift register 17. The grouping magnetic cores 92 through 97 are responsive to the character information stored in the mark and space shift registers 15 and 17 to perform functions also to be described.

The mark shift register 15, the space shift register 17 and the magnetic cores 89 through 97 are each connected to a code converter 24. The code converter 24 preferably includes a diode or rectifier matrix. Examples of this type of code converter are known in the art and need not be described in detail. One example of a code converter using a diode matrix which can be readily adapted for use in the circuit of the invention is shown and described in United States Patent Number 2,716,156 issued August 23, 1955 to James S. Harris for Code Converter. The diode matrix 24 functions in response to signals applied thereto from the mark shift register 15, space shift register 17 and the grouping magnetic cores 92 through 97 to convert a five-unit telegraph code character into a corresponding seven-unit telegraph code character of a seven-unit protected telegraph code. The diode matrix 24 is also designed to produce predetermined seven-unit telegraph code characters of the seven-unit protected telegraph code in response to signals applied thereto from the idle data magnetic cores 89 through 91. The seven-unit telegraph code characters appearing at the output of the diode matrix 24 are applied to an output shift register 98. The output shift register 98 includes a chain of fourteen magnetic cores 99 through 112 arranged in two rows of seven magnetic cores each. The operation of the output shift register 98 is similar to that described in connection with the space shift register 17. The even numbered magnetic cores constitute a line of storage cores, while the odd numbered magnetic cores constitute a line of temporary storage cores. A "one" inserted in a magnetic core of the output shift register 98 is advanced core-by-core along the chain of magnetic cores 99 through 112 in response to shift current pulses applied at first to the shift windings on the line of storage cores and, thereafter, to the shift windings on the line of temporary storage cores. The signal elements of each converted seven-unit telegraph code character appear serially in the output circuit of the output shift register 98 for application to the transmitting terminal station 11.

The distributing circuit 13, mark shift register 15, space shift register 17, idle data magnetic cores 88 through 91, grouping magnetic cores 92 through 97, diode matrix 24 and the output shift register 98 are operated in timed sequence in response to the timing current pulses applied thereto from the driving unit 32. The driving unit 32 includes gating triode vacuum tubes 113 through 116, blocking oscillator triode vacuum tubes 117 through 120 and driving triode vacuum tubes 121 through 126. The driving unit 32 supplies the required current pulses in the proper sequence and at the desired rates of frequency in response to the operation of the timing wave generator 31. In order to conserve space, various ones of the triode vacuum tubes which are similar in construction and function may be combined in actual practice as duo-triode vacuum tubes. This construction has been shown in the drawing wherever possible.

The continuous train of timing pulses P4′ through P19′, indicated by the smaller arrows in Figure 3, is applied from the timing wave generator 31 to the control grid of the gating tube 113 over an electrical path including lead 130 and coupling capacitor 131. The timing pulses may, for example, occur at approximately 208 microsecond intervals. The gating tube 113 is normally biased beyond cut off, and is rendered conducting in response to each timing pulse applied to the control grid thereof from the timing wave generator 31. During the intervals in which the tube 113 is conducting, current is caused to flow over lead 132 and through the primary winding 133 of a magnetic core transformer 134 included in the plate circuit of the blocking oscillator tube 117. A positive voltage is induced in the secondary winding 135 of transformer 134 which is applied to the control grid of tube 117, raising the potential on the control grid to a level such that tube 117 conducts. As the current through the primary winding 133 increases, the positive voltage applied to the control grid of tube 117 also increases until a point of saturation is reached. The current through the primary winding 133 stops increasing, and a positive voltage is no longer induced across the secondary winding 135. A charge on capacitor 136, built up during the time that voltage was being induced in the secondary winding 135, leaks off onto the control grid of tube 117. Tube 117 continues to conduct until the control grid goes negative with respect to the cathode. A sharp, positive pulse of a duration determined largely by the transformer magnetizing inductance and to a lesser degree by the value of capacitor 136 is produced which is applied over lead 137 from the control grid of tube 117 to the control grid of the driving tube 121. Tube 121 becomes conducting. The positive pulse applied to the control grid of tube 121 is amplified, and appears as a negative, shift current pulse in the plate circuit of tube 121. In this manner, a series of shift current pulses appears in the plate circuit of tube 121.

As each shift current pulse is produced by the operation of tube 121, current flows over an electrical path including lead 138, the shift windings 59 and 139 through 144 on the storage magnetic cores 44, 46, 48, 50, 52, 54 and 56, respectively, in the space shift register 17, the shift windings 145 through 151 on the storage magnetic cores 71, 73, 75, 77, 79, 81 and 83, respectively, in the mark shift register 15 and the input winding 152 on magnetic core 85 in the distributing circuit 13. The voltage induced in the input winding 152 upon the reception of each of the shift current pulses causes a "one" to be inserted in the magnetic core 85. The magnetic cores 44, 46, 48, 50, 52, 54 and 56 in the space shift register 17 and the magnetic cores 71, 73, 75, 77, 79, 81 and 83 in the mark shift register 15 are each made to assume a "zero" state upon the application thereto of each shift current pulse. If one or more of the storage magnetic cores in the mark and space shift registers 15 and 17 is already in a "zero" state the status thereof is merely confirmed.

In addition to the above circuit operations, each positive pulse produced by the operation of the tube 117 is applied from the control grid of tube 117 to the control grid of driving tube 126 over an electrical path including lead 153 and resistor 154. Tube 126 conducts in response to each positive pulse applied thereto and a series of shift current pulses appears in the plate circuit of tube 126. As each shift current pulse is produced by the operation of tube 126, current flows over an electrical path including lead 155 and the shift windings 156 through 162 on the storage magnetic cores 100, 102, 104, 106, 108, 110 and 112 in the output shift register 98. Each of the storage magnetic cores in the output shift register 98 is made to assume a "zero" state. The status of one or more of the storage magnetic cores already in a "zero" state is merely confirmed.

A train of timing pulses including the timing pulses P4 through P12 and P14 through P19, indicated by the larger arrows in Figure 3, is applied from the timing wave generator 31 to the control grid of the gating tube 114 over an electrical path including lead 163 and coupling capacitor 164. The timing pulses applied to the control grid of tube 114 occur at regular time intervals such that each of the timing pulses is applied to the control grid of tube 114 one half cycle at the operating frequency before the next one of the timing pulses P4′ through P19′ in time is applied to the control grid of tube 113. Tube 114 is normally biased beyond cut off, and is rendered conducting upon the reception of each of the timing pulses supplied by the timing wave generator 31 over lead 163. During the periods in which tube 114 is conducting, current is caused to flow over lead 165 and through the primary winding 166 of a transformer 167 included in the plate circuit of the blocking oscillator tube 118. The tube 118 operates in exactly the same manner as described in connection with tube 117. The positive pulses produced by the operation of tube 118 are applied to the control grid of the driving tube 122 over an electrical path including lead 168. The tube 122 functions to produce a negative, shift current pulse in the plate circuit thereof for each positive pulse applied to the control grid, and a series of shift current pulses appears in the plate circuit of tube 122. Upon the appearance of each shift current pulse in the plate circuit of tube 122, current flows over an electrical path including lead 169, shift windings 64, 170 through 175 on the temporary storage magnetic cores 45, 47, 49, 51, 53, 55 and 57, respectively, in the space shift register 17, shift windings 176 through 182 on the temporary storage magnetic cores 72, 74, 76, 78, 80, 82 and 84, respectively, in the mark shift register 15, and the shift windings 183 through 185 on the magnetic cores 85 through 87, respectively, in the distributing circuit 13. Any of the temporary storage cores in the mark and space shift registers 15 and 17 and any of the magnetic cores 85 through 87 in the distributing circuit 13 in a "one" state at the time that a shift current pulse is applied thereto will be made to shift into a "zero" state.

The positive pulses produced by the operation of tube 118 are also applied from the control grid of tube 118 to the control grid of the driving tube 125 over an electrical path including lead 186, lead 187 and a resistor 188. Tube 125 is rendered conducting in response to each of the positive pulses applied to the control grid thereof such that a series of negative, shift current pulses appears in the plate circuit of the tube 125. As each shift current pulse appears in the plate circuit of tube 125, current flows over an electrical path including shift windings 189 through 195 on the temporary storage magnetic cores 99, 101, 103, 105, 107, 109 and 111, respectively, in the output shift register 98. Any of the temporary storage magnetic cores in the output shift register 98 in a "one" state at the time a shift current pulse is applied thereto will be shifted into a "zero" state. As outlined above, a series of shift current pulses will appear in the respective plate circuits of tubes 121, 126 which are one hundred and eighty degrees out of phase, in time relation, with a series of shift current pulses appearing in the respective plate circuits of tubes 122 and 125.

As each positive pulse is applied from the control grid of tube 118 to the control grid of tube 125 over leads 186 and 187, it is also applied to the control grid of driving tube 124 over an electrical path including lead 186, lead 196 and resistor 197. Tube 124 produces a series of current pulses which are applied to the shift windings 198 through 203 on the magnetic cores 92 through 97, respectively, indicated generally as the magnetic core grouping circuits 21. The application of a shift current pulse to any of the magnetic cores 92 through 97 in a "one" state causes the magnetic core to shift into a "zero" state. The status of any of the magnetic cores 92 through 97 in a "zero" state is merely confirmed.

The code converting circuit will complete a cycle of operation in the time elapsing between the appearance of the timing pulses P4′ and P19′ which are applied to the control grid of tube 113 from the timing wave generator 31. When the timing pulse P4′ is applied to the control grid of tube 113 over lead 130, tube 113 conducts. A negative pulse is applied to the plate of tube 117 over lead 132. A positive pulse is applied from the control grid of tube 117 to the control grid of tube 121 over lead 137, causing tube 121 to conduct. A shift current pulse is applied to the shift windings 59, 139 through 151 on the storage magnetic cores in the mark and space shift registers 15 and 17 and to the input winding 152 on the magnetic core 85 in the distributing circuit 13 over lead 138. The magnetic core 85 is made to assume a "one" state. Timing pulse P5 is thereafter applied to the control grid of tube 114 from the timing wave generator 31 over lead 103. Tube 114 conducts, and a negative pulse is applied to the plate of tube 118 over lead 165. A positive pulse is applied from the control grid of tube 118 to the control grid of tube 122 over lead 168. A shift current pulse in the plate circuit of tube 122 is applied to the shift windings 64, 170 through 182 on the temporary storage magnetic cores in the mark and space shift registers 15 and 17 and to the shift windings 183 through 185 on the magnetic cores 85 through 87, respectively, in the distributing circuit 13 over lead 169. The magnetic core 85 is shifted from a "one" state into a "zero" state, and current flows over an electrical path including output winding 204 on the magnetic core 85, lead 205, rectifier 206 and the input winding 58 on the first magnetic core 44 in the space shift register 17. The current pulse applied to the winding 58 is in the proper polarity to cause magnetic core 44 to shift into a "one" state.

As discussed in connection with the block diagram given in Figure 1, the transmitting terminal station 11 functions to make seven-unit signal characters available for application to the code converting circuit. The first two units are used for traffic information, while the remaining five units are used for character information. If the customer's station 10 is connected to the transmitting terminal station 11 such that a beta traffic condition exists, the first unit in each signal character is a marking element. When the customer's station 10 is not connected to the transmitting terminal station 11 and an alpha traffic condition exists, the first unit in each signal character is a spacing element. If either the customer's station 10 or the transmitting terminal station 11 is proceeding to transmit a message signal, the second unit is a marking element, corresponding to the start element included in each code character of the message signal. When a message signal is not available for transmission, the second unit is a spacing element. The second unit is therefore used to designate the idle or no-idle condition of operation while the first unit indicates whether or not the customer's station 10 is connected to the transmitting terminal station 11. The third through seventh units correspond to the signal elements included in a five-unit telegraph code character included in a message signal originating at the customer's station 10 or at the transmitting terminal station 11.

Various known circuits and equipment may be provided at the transmitting terminal station 11 to produce the signal characters in the manner described. For example, a magnetic core shift register of the type generally defined as a parallel in-serial out shift register may be included in the output circuit of the transmitting terminal station 11. If a single-core-per-bit shift register is used, the shift register includes at least seven storage magnetic cores connected in a train. On the other hand, if a two-core-per-bit shift register is used, the shift register includes a train of at least fourteen magnetic cores arranged in a row of seven storage cores and a row of seven temporary storage cores. A signal character is first established in the shift register by causing each of the seven storage magnetic cores to assume a given state in response to a signal applied thereto over a separate circuit. Thereafter, the signal character is advanced out of the shift register such that the seven units included therein represented by current pulses or no current pulses are applied in series to the distributing circuit 13 over lead 14. At the time a signal character is established in the shift register, a first one of the magnetic cores included therein is made to assume a "one" state if a connection is completed between the customer's station 10 and the transmitting terminal station 11, beta, and a "zero" state if such a connection is not completed, alpha. This function may be performed by a circuit connected to the first magnetic core and including a simple on-off switch located at the operator's position. The second or next magnetic core in the shift register is made to assume a "one" state if a no-idle traffic condition exists and a "zero" state if an idle condition exists, for example, in response to the operation of auxiliary contacts included in a telegraph transmitting distributor. If a no-idle condition exists such that a message signal is available for transmission, signals corresponding to the signal elements of a five-unit telegraph code character included in the message signal are applied in parallel over separate circuits from, for example, the telegraph transmitting distributor to the remaining five magnetic cores in the shift register. The magnetic cores are each arranged to assume a "one" state upon the reception of a marking element and to remain in a "zero" state upon the reception of a spacing element. Following the establishment of a signal character in the shift register, the information stored in the magnetic cores is advanced core-by-core out of the shift register such that the first unit of the signal character applied over lead 14 indicates an alpha or beta condition and the second unit indicates an idle or no-idle condition. The following five units correspond to the signal elements of the five-unit telegraph code character included in the message signal. The circuits and equipment used in the transmitting terminal station 11 to perform the functions outlined above can be determined according to the requirements of a particular application. The telegraph transmitting terminal station 11 per se forms no part of the present invention.

Each signal character is applied, in turn, from the transmitting terminal station 11 to the distributing circuit 13 such that the seven units thereof coincide in time with the timing pulses P5′ through P11′ applied from the timing wave generator 31 to the tube 113. In order to achieve this synchronous operation, the operations of the transmitting terminal station 11 may be controlled by timing pulses supplied thereto from the timing wave generator 31 in the manner described in connection with Figure 1. It will first be assumed that the customer's station 10 is connected to the transmitting terminal station 11 and that a message signal is available for transmission by the customer's station 10. It will further be assumed that the first character in the message signal is the letter character H. The character H in the five-unit telegraph code includes the first, second and fourth elements as spacing and the third and fifth elements as marking. The five-unit code character is received by the transmitting terminal station 11 and a seven-unit signal character including the first (beta), second (no-idle), fifth and seventh units as marking and the third, fourth and sixth units as spacing is applied serially to the distributor circuit 13.

The actions resulting from the reception of the timing pulses P4′ and P5 have been described. When the timing pulse P5′ is applied to the control grid of tube 113 over lead 130, a shift current pulse appears in the plate circuit of tube 121 following the circuit operations described. A current pulse is applied to the shift winding 59 on the magnetic core 44 over lead 138. The current pulse is of the proper polarity to cause the magnetic core 44 to shift into a "zero" state, the next magnetic core 45 included in the space shift register 17 being thereby shifted into a "one" state. The "one" is, in other words, advanced from the first magnetic core 44 to the second magnetic core 45 in the space shift register 17. At the same time, the current pulse is also applied over lead 138 to the input winding 152 on the magnetic core 85 in the distributing circuit 13, causing the magnetic core 85 to assume a "one" state.

While the above circuit operations are taking place, the first unit of the signal character is applied from the transmitting terminal station 11 to the control grid of a gating triode vacuum tube 207 over a electrical path including the terminal 208 and lead 14. Terminal 208 is shown in Figure 1, for purposes of reference, in the lead connection 14 between the transmitting terminal station 11 and the distributing circuit 13. Tube 207 is normally biased beyond cut off. The first unit received is a marking element (beta). Tube 207 conducts, and a negative current pulse is applied from the plate of tube 207 to the series connected input windings 209, 210 on the magnetic core 86 and to the series connected input windings 211, 212 on the magnetic core 87 over a lead 213. The magnetic cores 86, 87 in the distributing circuit 13 are each made to assume a "one" state.

The next timing pulse P6 is, thereafter, applied to the control grid of tube 114 from the timing wave generator 31. A shift current pulse is applied to the shift winding 64 on the magnetic core 45 and to the shift windings 183 through 185 on the magnetic cores 85 through 87, respectively, over lead 169. The magnetic core 45 is shifted into a "zero" state, causing the next magnetic core 46 in the space shift register 17 to be shifted into a "one" state. The magnetic core 87 is shifted into a "zero" state, causing current to flow over an electrical path including output winding 214 on the magnetic core 87, lead 215, rectifier 216, and the input winding 217 on the first magnetic core 71 in the mark shift register 15. The magnetic core 71 is made to assume a "one" state. The voltage induced in the shift windings 183, 184 on the magnetic cores 85, 86, respectively, causes a "one" to be advanced out of the respective magnetic cores 85, 86 at the same time. The output winding 204 on the magnetic core 85 is connected in parallel with the output winding 218 on the magnetic core 86 with respect to ground. The term ground, as used in the specification, is to be understood as referring to a point of fixed reference potential. As indicated by the location of the dots adjacent the respective windings 204, 218, the current flowing through one of the output windings 204 over an electrical path including rectifier 206 is of a polarity opposite to that flowing through the other output winding 218 over an electrical path including rectifier 219. In other words, the output of the magnetic core 85 is phased in the opposite sense with respect to ground as compared to the output of the magnetic core 86. By alternating current transformer theory, the flux linkages cancel one another such that the net output of the two magnetic cores 85, 86 with respect to ground is substantially zero. No effective energy is applied to the input winding 58 on the magnetic core 44 over lead 205, and the magnetic core 44 remains in a "zero" state.

At the time of the timing pulse P6′, a shift current pulse is applied to the shift winding 139 on the magnetic core 46 in the space shift register 17, shift winding 145 on the magnetic core 71 in the mark shift register 15 and input winding 152 on the magnetic core 85 in the distributing circuit 13 over lead 138. The "one" stored in the magnetic core 46 is advanced into the next magnetic core 47 of the space shift register 17, while the "one" stored in the magnetic core 71 is advanced into the next magnetic core 72 of the mark shift register 15. The magnetic core 85 is made to assume a "one" state. The next or second unit of the incoming signal character is applied to the control grid of tube 207. Since the second unit is a marking element (no-idle), tube 207 becomes conducting. The magnetic cores 86, 87 are each made to assume a "one" state.

When timing pulse P7 is applied to the control grid of tube 114, a shift current pulse is applied to the shift winding 170 on the magnetic core 47, the shift winding 176 on the magnetic core 72 and the shift windings 183 through 185 on the magnetic cores 85 through 87, respectively, over lead 169. The "one" stored in the magnetic core 47 is advanced out of the magnetic core 47 and inserted into the next magnetic core 48 in the space shift register 17, while the "one" stored in the magnetic core 72 is advanced out of the magnetic core 72 and inserted into the next magnetic core 73 of the mark shift register 15. Magnetic core 87 is shifted into a "zero" state, causing a "one" to be inserted into the first magnetic core 71 of the mark shift register 15 by the resulting current flow over lead 215. The magnetic cores 85, 86 are both shifted into a "zero" state. Since a cancellation of the output signals produced by the magnetic cores 85, 86 occurs, the first magnetic core 44 of the space shift register 17 remains in a "zero" state.

At the time of the timing pulse P7′, the magnetic core 48 is shifted into a "zero" state and a "one" is inserted into the next magnetic core 49 of the space shift register 17. The magnetic cores 71, 73 are each shifted into a "zero" state and a "one" is inserted into the respective magnetic cores 72, 74 of the mark shift register 15. The magnetic core 85 is made to assume a "one" state. The third unit of the incoming signal character and the first unit of the five-unit code character H, a spacing element, is applied from the terminal 208 to the control grid of tube 207. Tube 207 remains non-conducting, and, therefore, the magnetic cores 86, 87 in the distributing circuit 13 each remain in a "zero" state.

Upon the reception by tube 114 of the timing pulse P8, the magnetic core 49 is shifted into a "zero" state. A "one" is inserted into the next magnetic core 50 of the space shift register 17. The magnetic cores 72, 74 are shifted into a "zero" state, and a "one" is inserted into the respective magnetic cores 73, 75 of the mark shift register 15. Magnetic core 86 is at this time in a "zero" state. As a result, a voltage is not induced in output winding 218 to oppose the action of magnetic core 85. Since no cancellation takes place, a "one" is inserted into the first magnetic core 44 of the space shift register 17 by the current flow over lead 205 resulting from the shifting of the magnetic core 85 from a "one" into a "zero" state. A "one" will be stored in the magnetic cores 44 and 50 of the space shift register 17 and in the magnetic cores 73 and 75 of the mark shift register 15.

The circuit operations which occur upon the reception of the fourth through seventh units of the incoming signal character are similar to those described above. Upon the reception of a spacing element, a "one" is inserted into the first magnetic core 44 of the space shift register 17. Upon the reception of a marking element, a "one" is inserted into the first magnetic core 71 of the mark shift register 15, a cancellation of the outputs of the magnetic cores 85, 86 taking place such that the magnetic core 44 remains in a "zero" state. Thus, the reception of the fourth unit, a spacing element, and of the timing pulses P8′ and P9 results in a "one" being stored in the magnetic cores 44, 46 and 52 of the space shift register 17 and in the magnetic cores 75, 77 of the mark shift register 15. Upon the reception of the fifth unit, a marking element, and of the timing pulses P9′ and P10, a "one" is stored in the magnetic cores 46, 48 and 54 of the space shift register 17 and in the magnetic cores 71, 77 and 79 of the mark shift register 15.

Following the reception of the sixth unit, a spacing element, and of the timing pulses P10′ and P11, a "one" is stored in the magnetic cores 44, 48, 50 and 56 of the space shift register 17 and in the magnetic cores 73, 79 and 81 of the mark shift register 15. The reception of the seventh and last unit, a marking element, and of the timing pulses P11′ and P12 causes a "one" to be stored in the magnetic cores 46, 50 and 52 of the space shift register 17 and in the magnetic cores 71, 75, 81 and 83 of the mark shift register. A "one" is, therefore, stored in the magnetic cores 52, 50 and 46 of the space shift register 17 corresponding to the third, fourth and sixth units as spacing in the incoming signal character, while a "one" is stored in the magnetic cores 83, 81, 75 and 71 of the mark shift register 15 corresponding to the first, second, fifth and seventh units as marking in the incoming signal character. The incoming signal character appears in binary form in the mark and space shift registers 15 and 17, the signal character being stored in one sense in the mark shift register 15 and in the opposite sense in the space shift register 17.

The incoming signal character including beta, no-idle traffic information and the five units of the letter character H is stored in binary form in the mark and space shift registers 15 and 17 during the time interval between the timing pulses P5′ and P12 shown in Figure 3. Any information in the form of a "one" stored in one or more of the magnetic cores in the space shift register 17 and in the mark shift register 15 prior to the reception of the incoming signal character is completely cleared out of the respective shift registers 15, 17 when all of the units of the incoming signal character are received. For example, the "one" originally inserted into the space shift register 17 upon the reception of the timing pulse P4′ is advanced into the magnetic core 57 upon the reception of the timing pulse P11′. The reception of the timing pulse P12 causes a shift current pulse to be applied to the shift winding 175 on the magnetic core 57, causing the magnetic core 57 to shift into a "zero" state. The "one" is, therefore, effectively read out of the space shift register 17. The only information stored in the space shift register 17 following the reception of the timing pulse P12 will be that corresponding to the arrangement of spacing elements in the incoming signal character. A "one" is stored in the magnetic cores 52, 50 and 46 of the space shift register 17, the remaining magnetic cores included in the space shift register 17 having a "zero" stored therein. The only information stored in the mark shift register 15 following the reception of the timing pulse P12 will be that corresponding to the arrangement of marking elements in the incoming signal character. A "one" is stored in the magnetic cores 83, 81, 75 and 71 of the mark shift register 15, the remaining magnetic cores in the mark shift register 15 having a "zero" stored therein.

Magnetic core 83 includes a pair of output windings 221, 222 which are series-connected between ground and the control grid of a driving triode vacuum tube 224 over an electrical path including lead 223, lead 225, rectifier 226, an integrating circuit including resistor 227 and capacitor 228, and a coupling capacitor 229. The plate circuit of tube 224 is connected to the input winding 230 on the beta magnetic core 91 over an electrical path including lead 231 and a rectifier 232. Series-connected output windings 242, 243 are mounted on the magnetic core 81 and are included in an electrical path completed from ground to the control grid of a driving triode vacuum tube 233, the electrical path including lead 223, lead 234, rectifier 235, an integrating circuit including resistor 236 and capacitor 237, and a coupling capacitor 238. The plate circuit of tube 233 is connected to the input winding 239 on the no-idle magnetic core 88 over an electrical path including lead 240 and a rectifier 241. The magnetic cores 54, 56 are connected in a similar manner to the idle and alpha magnetic cores 89, 90, respectively. The series-connected output windings 254, 255 on the magnetic core 54 are included in an electrical path completed from ground to the control grid of a driving triode vacuum tube 244 and including a lead 245, lead 246, rectifier 247, an integrating circuit including resistor 248 and capacitor 249, and a coupling capacitor 250. The plate circuit of tube 244 is connected to the input winding 251 on the idle magnetic core 89 over an electrical path including lead 252 and rectifier 253. The series-connected output windings 256, 257 on the magnetic core 56 are included in an electrical path completed from ground to the control grid of a driving triode vacuum tube 258 and including lead 245, a lead 259, rectifier 260, an integrating circuit including resistor 261 and capacitor 262, and a coupling capacitor 263. The plate circuit of tube 258 is connected to the input winding 264 on the alpha magnetic core 90 over an electrical path including lead 265 and a rectifier 266.

The reception of the timing pulse P12 by the tube 114 will cause each of the magnetic cores 92 through 97 in the magnetic core grouping circuits 21 to assume a "zero" state. The timing wave generator 31, in addition to including the timing pulse P12 in the pulse train applied to the control grid of tube 114, functions to apply the timing pulse P12 to the control grid of gating tube 115 over an electrical path including lead 276 and coupling capacitor 277. Tube 115 normally biased beyond cut off conducts and a negative current pulse is applied from the plate of tube 115 to the plate of blocking oscillator tube 119 over lead 278. Tube 119 functions in the manner described in connection with tubes 117, 118 to produce a positive current pulse which is applied from the control grid of tube 119 to the control grid of driving tube 123 over lead 279. Tube 123 conducts, and a negative shift current pulse is applied from the plate of tube 123 to the shift windings 280 through 283 on the idle data magnetic cores 88 through 91, respectively, over a lead 284. The magnetic cores 88 through 91 are each made to assume a "zero" state. Following the reception of the timing pulse P12, therefore, an electrical condition corresponding to the incoming signal character is established in the storage magnetic cores of the mark and space shift registers 15 and 17. The idle data magnetic cores 88 through 91 and the grouping magnetic cores 92 through 97 are each in a "zero" state. According to the example given, no-idle traffic information and the letter character H will be stored in the mark and space shift registers 15 and 17.

Upon the application of the timing pulse P12′ from the timing wave generator 31 to the control grid of tube 113 over lead 130, a shift current pulse is applied to the line of storage magnetic cores 44, 46, 48, 50, 52, 54 and 56 in the space shift register 17 and to the line of storage magnetic cores 71, 73, 75, 77, 79, 81 and 83 in the mark shift register 15. The magnetic cores 83, 81, 75 and 71, having a "one" stored therein, are each shifted into a "zero" state and a "one" is inserted into the next magnetic cores 84, 82, 76 and 72, respectively, of the mark shift register 15. The magnetic cores 52, 50 and 46, having a "one" stored therein, are also shifted into a "zero" state and the next magnetic cores 53, 51 and 47, respectively, of the space shift register 17 are each made to assume a "one" state. Voltage induced in the output windings 221, 222 on the magnetic core 83 causes current to flow over the electrical path including lead 225 and rectifier 226 such that a positive pulse is applied to the control grid of tube 224. Tube 224 conducts, and a negative pulse is applied to the input winding 230 on the beta magnetic core 91 over the electrical path including lead 231 and rectifier 232. The magnetic core 91 is made to assume a "one" state. Voltage is also induced in the output windings 242, 243 on the magnetic core 81, causing a positive pulse to be applied to the control grid of tube 233 over the electrical path including lead 234 and rectifier 235. Tube 233 conducts, and a negative pulse is applied to the input winding 239 on the no-idle magnetic core 88 over the electrical path including lead 240 and rectifier 241. By this action, the no-idle and beta magnetic cores 88 and 91, respectively, are each made to assume a "one" state. As the magnetic cores 54, 56 are each in a "zero" state at the time of the timing pulse P12′, the idle and alpha magnetic cores 89 and 90, respectively, each remain in a "zero" state. In this manner, information corresponding to the traffic information stored in the mark and space shift registers 15 and 17 is stored in the idle data magnetic cores 19.

The function of the grouping magnetic cores 92 through 97 will now be described. The code converting circuit of the invention is designed to include a diode matrix 24 of the type shown and described in United States Patent Number 2,716,156, issued August 23, 1955 to James S. Harris for Code Converter. A diode matrix for converting five-unit code characters into corresponding seven-unit code characters is presented. Each signal element in a seven-unit code character produced by the operation of diode matrix 24 is determined as a function of one or more of the signal elements in a received five-unit code character. That is to say, a signal element of the seven-unit code character is determined to be spacing or marking in nature according to whether certain of the signal elements in the received five-unit code character are marking or spacing in nature. In order to perform the logic of the diode matrix 24, it is necessary to group certain of the signal elements included in the received five-unit code character and to apply the resulting signals to the diode matrix 24. This latter function is performed by the grouping magnetic cores 92 through 97 in the code converting circuit of the invention. Reference should be made to the United States Patent Number 2,716,156, above, for a complete description of the construction and operation of the diode matrix 24. The diode matrix 24, in itself, forms no part of the present invention.

When the "one" is advanced out of the magnetic core 75 and inserted into the magnetic core 76 of the mark shift register 15, a voltage is induced in the series-connected output windings 285, 286 on the magnetic core 75. A positive pulse is applied to the control grid of a driving triode vacuum tube 287 over an electrical path including lead 223, lead 288, rectifier 289, an integrating circuit including resistor 290 and capacitor 291, coupling capacitor 292 and lead 293. Tube 287 conducts, and a negative pulse is applied to the input winding 294 on the grouping magnetic core 92 over an electrical path including lead 295 and rectifier 296. When the "one" is advanced out of the magnetic core 71 and inserted into the magnetic core 72 of the mark shift register 15, a positive pulse is applied to the control grid of tube 297 over an electrical path including lead 223, the series-connected output windings 298, 299 on the magnetic core 71, lead 300, rectifier 301, an integrating circuit including resistor 302 and capacitor 303, and a coupling capacitor 304. Tube 297 conducts, and a negative pulse is applied to the input winding 305 on the grouping magnetic core 93 over an electrical path including lead 306 and rectifier 307. In addition, the positive pulse is applied from the magnetic core 71 to the control grid of a driving triode vacuum tube 308 over an electrical path including lead 300, rectifier 309, an integrating circuit including resistor 310 and capacitor 311, a coupling capacitor 312 and lead 313. Tube 308 conducts, and a negative pulse is applied to the input winding 314 on the grouping magnetic core 96 over an electrical path including lead 315 and rectifier 316. As a result of the shifting in state of the magnetic cores 71 and 75 in the mark shift register 15, therefore, the grouping magnetic cores 92, 93 and 96 each assume a "one" state.

When the "one" is advanced out of the magnetic core 50 and inserted into the magnetic core 51 of the space shift register 17, a positive pulse is applied from the magnetic core 50 to the control grid of a driving triode vacuum tube 317 over an electrical path including lead 245, series-connected output windings 318, 319 on the magnetic core 50, lead 320, rectifier 321, an integrating circuit including resistor 322 and capacitor 323, coupling capacitor 324 and lead 325. Tube 317 conducts, and a negative pulse is applied to the input winding 326 on the grouping magnetic core 94 over an electrical path including lead 327 and rectifier 328. When the "one" is advanced out of the magnetic core 46 and inserted into the magnetic core 47 of the space shift register 17, a positive pulse is applied to the control grid of a driving triode vacuum tube 329 over an electrical path including lead 245, series-connected output windings 330, 331 on the magnetic core 46, lead 332, rectifier 333, an integrating circuit including resistor 334 and capacitor 335, a coupling capacitor 336 and lead 337. Tube 329 conducts, and a negative pulse is applied to the input winding 338 on the grouping magnetic core 97 over an electrical path including lead 339 and rectifier 340. Grouping magnetic cores 94 and 97 each assume a "one" state. A "one" is inserted into the grouping magnetic core 95, if a "one" is advanced out of the magnetic core 73 of the mark shift register 15 or out of the magnetic core 44 of the space shift register 17 upon the reception of the timing pulse P12'. Since neither of these conditions exist, the grouping magnetic core 95 remains in a "zero" state. It should be noted that, when the "one" is advanced out of magnetic core 46, a positive pulse is also applied to the control grid of tube 308. Tube 308 is, therefore, responsive to a positive pulse applied thereto by the action of the magnetic core 71, as described, and/or to a positive pulse applied thereto by the action of the magnetic core 46 to cause a "one" to be inserted into the grouping magnetic core 96.

In review, following the reception of the timing pulse P12', the received signal character is stored in binary form in the temporary storage magnetic cores of the mark and space shift registers 15 and 17. An electrical condition is established in the idle data magnetic cores 19 according to the traffic information included in the received signal character (as determined by the state of the magnetic cores 81, 83 of the mark shift register 15 and of the magnetic cores 54, 56 of the space shift register 17 when the timing pulse P12' is received). An electrical condition is also established in the grouping circuits 21 according to the nature of the second through fifth elements of the five-unit code character or, in other words, the fourth through seventh units of the received signal character (as determined by the state of the magnetic cores 71, 73, 75 and 77 of the mark shift register 15 and of the magnetic cores 44, 46, 48 and 50 of the space shift register 17 when the timing pulse P12' is received).

The temporary storage magnetic cores 72, 74, 76, 78 and 80 in the mark shift register 15 are connected over identical electrical circuits including leads 345 through 349, respectively, to separate input terminals 1M through 5M of the diode matrix 24. For example, an electrical circuit is completed from the magnetic core 80 to the input terminal 1M including series-connected output windings 350, 351, lead 349, resistor 352 and capacitor 353 by-passed to ground, and so on. The temporary storage magnetic cores 45, 47, 49, 51 and 53 in the space shift register 17 are connected over similar electrical circuits including leads 354 through 358, respectively, to the input terminals 1S through 5S of the diode matrix 24. Thus, the magnetic core 53 is connected to input terminal 1S over an electrical circuit including series-connected output windings 359, 360, lead 358, resistor 361 and capacitor 362 by-passed to ground, and so on. As the shift current pulses appearing in the plate circuit of tube 122 are applied to the temporary storage magnetic cores 72, 74, 76, 78 and 80 in the mark shift register 15 and to the temporary storage magnetic cores 45, 47, 49, 51 and 53 of the space shift register 17 upon the reception of the timing pulses P5 through P12, a parallel output is obtained which is presented to the input terminals 1M through 5S of the diode matrix 24. The output will vary as the information in the form of "ones" is advanced core-by-core along the chains of magnetic cores in the respective shift registers 15, 17. The diode matrix 24, however, is controlled such that it cannot accept the signal energy applied to the input terminals 1M through 5S unless and until a battery is connected thereto. The battery is supplied to the diode matrix 24 only at the time of the timing pulse P13, and, therefore, the diode matrix 24 remains inoperative in response to the parallel output of the shift registers 15, 17 while the incoming signal character is being established in the shift registers 15, 17 in binary form.

The grouping magnetic cores 92 through 97 are connected over electrical circuits including leads 363 through 368 to the input terminals G1 through G6, respectively, of the diode matrix 24. For example, the grouping magnetic core 92 is connected to the input terminal G1 over an electrical circuit including series-connected output windings 369, 370, lead 363, resistor 371 and capacitor 372 by-passed to ground, and so on. Since the diode matrix 24 is rendered operative only at the time of the timing pulse P13, the diode matrix 24 remains non-responsive to signal energy applied from the grouping magnetic cores 92 through 97 to the input terminals G1 through G6, respectively, between the time of the timing pulse P5' and that of the timing pulse P12 when the incoming signal character is established in binary form in the mark and space shift registers 15 and 17.

Timing pulse P13 is applied from the timing wave generator 31 to the control grid of tube 115 over lead 276. Tube 115 conducts, and a positive pulse is applied from the control grid of tube 119 to the control grid of tube 123. A negative current pulse is applied from the plate of tube 123 to the shift windings 280 through 283 on the idle data magnetic cores 88 through 91, respectively, over lead 284. The no-idle magnetic core 88 and the beta magnetic core 91 are each shifted from a "one" state into a "zero" state. A current pulse is applied from the magnetic core 91 to the input terminal beta of the diode matrix 24 over an electrical path including lead 373, resistor 374 and capacitor 375 by-passed to ground. The diode matrix 24 is designed as a coincidence circuit to respond only to the simultaneous application of a current pulse to the input terminal idle and to one of the input terminals beta or alpha. As a no-idle traffic condition exists, the idle magnetic core 89 is in a "zero" state such that a "one" is not advanced out of the idle magnetic core 89 upon the reception of the timing pulse P13. A current pulse is not applied from the idle magnetic core 89 to the input terminal idle of the diode matrix 24 over lead 376. As a result, the application of the current pulse to the input terminal beta performs no function in the operation of the code converting circuit at this time.

A current pulse is also applied from the no-idle magnetic core 88 to the control grid of tube 114 over an electrical path including the output windings 377, 378 on the idle magnetic core 88, lead 379 and rectifier 380. Tube 114 conducts, causing a shift current pulse to appear in the plate circuit of tube 122. In effect, a timing pulse is added by the operation of the no-idle magnetic core 88 to the train of pulses applied to tube 114 from the timing wave generator 31.

The "ones" stored in the magnetic cores 76 and 72 of the mark shift register 15 are advanced out of the respective magnetic cores such that a current pulse is applied to the input terminals 3M and 5M of the diode matrix 24 over leads 347 and 345, respectively. At the same time, the "ones" stored in the magnetic cores 53, 51 and 47 of the space shift register 17 are advanced out of the respective magnetic cores such that a current pulse is applied to the input terminals 1S, 2S and 4S of the diode matrix 24 over leads 358, 357 and 355, respectively. The input terminals 1M through 5S are paired such that each pair includes a marking terminal and a spacing terminal. Five pairs of terminals are provided each representing a signal element included in the five-unit code character forming a part of the incoming seven-unit signal character. A current pulse is applied to one of the terminals in each pair depending upon whether the corresponding signal element is marking or spacing. The letter character H includes the first, second and fourth elements as spacing and the third and fifth elements as marking. Therefore, a current pulse is applied, in the example given, to the input terminals 1S, 2S, 3M, 4S and 5M of the diode matrix 24.

Simultaneously with the appearance of a shift current pulse in the plate circuit of tube 122, a shift current pulse appears in the plate circuit of tube 124. The shift current pulse is applied to the shift windings 198 through 203 on the grouping magnetic cores 92 through 97, respectively. The grouping magnetic cores 92, 93, 94, 96 and 97, having a "one" stored therein, are each shifted into a "zero" state. As a result, a current pulse is applied from the grouping magnetic cores 92, 93, 94, 96 and 97 to the input terminals G1, G2, G3, G5 and G6 of the diode matrix 24 over leads 363, 364, 365, 367 and 368, respectively.

In addition to applying the timing pulse P13 to the control grid of tube 115 over lead 276, the timing wave generator 31 functions to apply the timing pulse P13 to the control grid of the gating tube 116 over an electrical path including lead 381 and coupling capacitor 382. Tube 116, which is normally biased beyond cut-off, conducts, and a negative pulse is applied from the plate of tube 116 to the plate of blocking oscillator tube 120 over lead 383. Tube 120 conducts, and a positive pulse is applied from the control grid of tube 120 to the control grid of a cathode follower tube 385 over lead 384. Tube 385 conducts, and a positive pulse is applied from the cathode of tube 385 to the diode matrix 24, as battery, over an electrical circuit including a current boosting transformer 386 and lead 387. Upon the reception of the timing pulse P13, therefore, the information representing the five-unit character H is applied to the diode matrix 24. The binary information in the form of current pulses is applied from the mark and space shift registers 15 and 17 to the input terminals 1S, 2S, 3M, 4S and 5M of the diode matrix 24. At the same time, the grouping information is applied from the grouping magnetic cores 92, 93, 94, 96 and 97 to the input terminals G1, G2, G3, G5 and G6 of the diode matrix 24. The application of battery to the diode matrix 24 causes the diode matrix 24 to convert the information received representing the letter character H of the five-unit telegraph code into the corresponding letter character H of the seven-unit protected telegraph code.

The letter character H in the seven-unit protected telegraph code includes the first, third and sixth elements as marking, while the second, fourth, fifth and seventh elements are spacing. The diode matrix 24 is designed to supply a current pulse at the respective output terminals thereof for each marking element and no current pulse at the respective output terminals thereof for each spacing element. A current pulse will, therefore, appear at the output terminals 1T, 3T and 6T. The respective output terminals 1T through 7T of the diode matrix 24 are connected over identical circuits including leads 390 through 396 to the control grids of separate gating triode vacuum tubes 397 through 403, respectively. In the example given, a current pulse is applied from the output terminal 1T of the diode matrix 24 to the control grid of tube 397 over the electrical circuit including an integrating circuit comprising resistor 404 and capacitor 405, a back-biasing network including resistors 406, 407 and capacitor 408, coupling capacitor 409 and lead 390. A current pulse is also applied from the output terminals 3T and 6T to the respective control grids of tubes 399, 402 over similar electrical circuits including leads 392 and 395, respectively.

The gating tubes 397 through 403 are normally biased beyond cut off. Upon the application of the current pulses to the control grids thereof, tubes 397, 399 and 402 conduct. The respective plates of tubes 397 through 403 are connected to input windings on the magnetic cores 112, 110, 108, 106, 104, 102 and 100 of the output shift register 98 over leads 410 through 416, respectively. When one or more of the gating tubes 397 through 403 is rendered conducting by the application of a current pulse to the control grid thereof from the diode matrix 24, a negative, current pulse is applied from the plate circuit of the conducting tube to the input winding on the magnetic core in the output shift register 98 to which it is connected. In the example given, tubes 397, 399 and 402 conduct. A current pulse is applied from the plate circuit of tube 397 to the input windings 418, 419 on the magnetic core 112 of the output shift register 98 over lead 410. A current pulse is also applied from the plate circuit of tube 399 to the input windings 420, 421 on the magnetic core 108 of the output shift register 98 over lead 412. In addition, a current pulse is applied from the plate circuit of tube 402 to the input windings 422, 423 on the magnetic core 102 of the output shift register 98 over lead 415. A "one" is inserted in the magnetic cores 112, 108 and 102 of the output shift register 98.

Following the reception of the timing pulse P13, therefore, the converted code character is ready to be advanced out of the output shift register 98 and applied to the transmitting terminal station 11 for transmission to the remote receiving terminal station. Upon the application of the timing pulse P13′ to the control grid of tube 113, a shift current pulse appears in the plate circuit of tube 126. Current flows over the electrical circuit including lead 155, the shift windings 162, 160, and 157 on the magnetic cores 112, 108 and 102, respectively, of the output shift register 98. The "ones" stored in the magnetic cores 108 and 102 are advanced out of these magnetic cores and into the succeeding magnetic cores in the chain thereof in the output shift register 98 such that a "one" is stored in the magnetic cores 109 and 103. It will be remembered that a "one" was stored in the last magnetic core 112 of the output shift register 98. A voltage is induced in the output winding 424 on the magnetic core 112 such that a positive pulse is applied to the control grid of a gating triode vacuum tube 425 over an electrical circuit including lead 426, rectifier 427, a network connected to ground including resistor 428 and capacitor 429 and coupling capacitor 430. Tube 425, which is normally biased beyond cut-off, conducts. A negative pulse is applied from the plate of tube 425 to the control grid of gating triode vacuum tube 431 over an electrical path including lead 432, capacitor 433 by-passed to ground and coupling capacitor 434. The cathode of tube 431 is biased negatively such that tube 431 is normally conducting. The application of the negative pulse to the control grid of tube 431 causes tube 431 to cut-off, and a positive pulse is applied to the control grid of a cathode follower triode tube 435 over lead 436. Tube 435 conducts, and a current pulse or marking element is applied to output terminal 437 for application to the transmitting terminal station 11 over lead 29, representing the first signal element of the letter character H of the seven-unit protected telegraph code. The output terminal 437 is shown in Figure 1 for purpose of reference as included in the connection between the code converter 24 and the transmitting terminal station 11.

The following circuit operations can be determined from the description already given. Current will flow through the shift windings 189 through 195 on the magnetic cores 99, 101, 103, 105, 107, 109 and 111 upon the application of each of the timing pulses P14, P15, P16, P17, P18 and P19 from the timing wave generator 31 to the control grid of tube 114. Current will flow through the shift windings 156 through 162 on the magnetic cores 100, 102, 104, 106, 108, 110 and 112 upon the application of each of the timing pulses P14′, P15′, P16′, P17′, P18′ and P19′ to the control grid of tube 113 from the timing wave generator 31. The letter character H represented by a "one" and by the absence of a "one" stored in certain of the magnetic cores in the output shift register 98 is advanced core-by-core such that it is cleared out of the output shift register 98. Upon the reception of the timing pulse P14′, no voltage is induced in the output winding 424 on the magnetic core 112, tube 425 remains cut-off and an interval of no current flow or spacing element appears at the output terminal 437; upon the reception of timing pulse P15′, voltage is induced in the output winding 424, tube 425 conducts and an interval of current flow or marking element appears at the output terminal 437; upon the reception of the timing pulse P16′, no voltage is induced in the output winding 424, tube 425 remains cut-off and an interval of no current flow or spacing element appears at output terminal 437; upon the reception of the timing pulses P17′, no voltage is induced in the output winding 424, tube 425 remains cut-off and an interval of no current flow or spacing element appears at the output terminal 437; upon the reception of the timing pulse P18′, voltage is induced in the output winding 424, tube 425 conducts, and an interval of current flow or marking element appears at output terminal 437; and upon the reception of the timing pulse P19′, no voltage is induced in the output winding 424, tube 425 remains cut-off and an interval of no current flow or spacing element appears at the output terminal 437. The letter character H of the seven-unit protected telegraph code comprising the first, third and sixth signal elements as marking and the second, fourth, fifth and seventh signal elements as spacing appears at the output terminal 437 for application to the transmitting terminal station 11 over lead 29.

The operation of the code converting circuit upon the reception at the input teminal 208 of a signal character including any character of the five-unit telegraph code is the same as outlined above. Information corresponding to the five-unit code character is stored in the mark and space shift registers 15 and 17 and in the grouping magnetic cores 92 through 97 at the time of the timing pulse P12′. The five-unit code character is thereafter converted into a corresponding code character of the seven-unit protected telegraph code and applied to the output terminal 437. The information stored in the grouping magnetic cores 92 through 97 at the time of the timing pulse P12′ will depend upon the particular five-unit code character included in the signal character received. From the above description and an examination of Figure 2, it can be seen that a "one" is inserted into the grouping magnetic core 92 if the second element of the five-unit code character is marking and, therefore, a "one" is advanced out of the magnetic core 77 of the mark shift register 15. A "one" is also inserted into the grouping magnetic core 92 if the third element of the five-unit code character is marking such that a "one" is advanced out of the magnetic core 75 of the mark shift register 15. Following similar logic, a "one" is inserted into the grouping magnetic core 93 if either or both of the fourth and fifth elements of the five-unit code character are marking; a "one" is inserted into the grouping magnetic core 94 if either or both of the second and third elements of the five-unit code character are spacing; a "one" is inserted into the grouping magnetic core 95 if the fourth element of the five-unit code character is marking and/or if the fifth element of the five-unit code character is spacing; a "one" is inserted into the grouping magnetic core 96 if the fourth element of the five-unit code character is spacing and/or if the fifth element of the five-unit code character is marking; and a "one" is inserted into the grouping magnetic core 97 if either or both of the fourth and fifth elements of the five-unit code character are spacing. In this manner, the necessary information is made available for application to the diode matrix 24 upon the reception of the timing pulse P13 such that the diode matrix 24 functions to convert the five-unit code character into the corresponding code character of the seven-unit protected telegraph code.

The description has been directed up to this point to the operation of the code converting circuit when the customer's station 10 is connected to the transmitting terminal station 11 and has a message signal available for transmission. The first unit of each signal character applied to the distributing circuit 13 is marking or beta, while the second unit is also marking or no-idle. When the customer's station 10 is not connected to the transmitting terminal station 11, the transmitting terminal station 11 may make use of the available operating time to transmit a message signal. The first unit of each signal character applied to the distributing circuit 13 is in this case spacing or alpha, while the second unit continues to be marking or no-idle. Following the reception of the timing pulse P12, a "one" is stored in the magnetic core 56 of the space shift register 17 and a "zero" is stored in the magnetic core 83 of the mark shift register 15. Upon the reception of the timing pulse P12′, a "one" will be inserted in the no-idle magnetic core 88 as before. However, a "one" will be inserted into the alpha magnetic core 90 instead of into the beta magnetic core 91. When the timing pulse P13 is received, the "one" is advanced out of the no-idle magnetic core 88 to, in effect, add a pulse to the train of timing pulses applied to tube 114 from the timing wave generator 31. A current pulse is also applied from the alpha magnetic core 90 to the input terminal alpha of the diode matrix 24 over an electrical circuit including lead 438. As previously mentioned, the diode matrix 24 functions as a coincidence circuit in that it performs no action in response to a current pulse applied to the input terminals alpha or beta in the absence of a current pulse simultaneously applied to the input terminal idle. As a no-idle condition exists, a current pulse is not applied to the input terminal idle and the diode matrix 24 remains non-responsive to the current pulse applied to the input terminal alpha. With the exception just mentioned, the code converting circuit will function in exactly the same manner as outlined above to convert the five-unit code characters included in the message signal originating at the transmitting terminal station 11 into the corresponding code characters of the seven-unit protected telegraph code.

The customer's station 10 may be operatively connected to the transmitting terminal station 11 but not have a message signal available for transmission such that an idle-beta condition exists. In this situation the transmitting terminal station 11 applies a train of seven-unit signal characters to the distributing circuit 13 each having the first unit marking or beta and the second unit spacing or idle. If the transmitting terminal station 11 includes a telegraph transmitting distributor of the type which stores the last code character transmitted pending the reception of the code characters in a new message signal, the remaining five-units in each signal character will correspond to the arrangement of signal elements in the code character stored in the telegraph transmitting distributor. In the alternative, equipment may be provided for preventing the inclusion of any character information in the signal characters such that the remaining five-units in each signal character are all spacing. As will become apparent, character information which may be included in the signal characters is, in effect, ignored by the code converting circuit when an idle traffic condition exists, as determined by the nature of the traffic information included in each signal character.

Following the application of each signal character to the mark and space shift registers 15 and 17, a "one" is stored in the magnetic core 83 of the mark shift register 15 and in the magnetic core 54 of the space shift register 17. At the time of the timing pulse P12′, the "one" is advanced out of the magnetic core 83, tube 224 conducts and a "one" is inserted into the beta magnetic core 91. The "one" is also advanced out of the magnetic core 54, tube 244 conducts and a "one" is inserted into the idle magnetic core 89. The no-idle magnetic core 88 and the alpha magnetic core 90 remain in a "zero" state.

Upon the reception of the timing pulse P13, the idle magnetic core 89 and the beta magnetic core 91 are each shifted into a "zero" state. A current pulse is applied from the idle magnetic core 89 to the input terminal idle of the diode matrix 24 over lead 376. A current pulse is also applied from the beta magnetic core 91 to the input terminal beta of the diode matrix 24 over lead 373. Since a "zero" is stored in the no-idle magnetic core 88, a current pulse is not applied from the no-idle magnetic core 88 to the tube 114. A shift current pulse is not, therefore, applied to the temporary storage magnetic cores in the mark and space shift registers 15 and 17 or to the grouping magnetic cores 92 through 97 at the time of the timing pulse P13. The only information applied to the diode matrix 24 at the time of the timing pulse P13 will be that supplied from the idle data magnetic cores 19 and, more particularly, from the idle magnetic core 89 and the beta magnetic core 91. The diode matrix 24 operates by the application of battery thereto and in a coincidence fashion to convert the information received in the form of current pulses at the input terminals idle and beta into a predetermined character of the seven-unit protected telegraph code. The character appears as an arrangement of current pulses and no current pulses at the output terminals 1T through 7T which are applied in parallel to the output shift register 98. The character is thereafter advanced out of the output shift register 98, the signal elements included therein appearing serially at the output terminal 437 for application to the transmitting terminal station 11 over lead 29.

In a situation where the customer's station 10 is not connected to the transmitting terminal station 11 and the transmitting terminal station 11 has no message signal available for transmission, each signal character applied to the distributing circuit 13 from the transmitting terminal station 11 includes the first unit as spacing or alpha and the second unit as spacing or idle. As each signal character is received, a "one" is stored in the magnetic cores 56 and 54 of the space shift register 17. At the time of the timing pulse P12′, the "ones" are advanced out of the magnetic cores 56 and 54. Tubes 244 and 258 conduct, and a "one" is inserted into the idle magnetic core 89 and into the alpha magnetic core 90. Upon the reception of the timing pulse P13, a current pulse is applied from the idle magnetic core 89 to the input terminal idle and from the alpha magnetic core 90 to the input terminal alpha of the diode matrix 24 over leads 376 and 438, respectively. The diode matrix 24 operates in coincidence fashion to convert the information received into a predetermined character of the seven-unit protected telegraph code which is different from that produced thereby upon the reception of the idle-beta information. The character appears as an arrangement of current pulses and no current pulses at the output terminals 1T through 7T which are applied in parallel to the output shift register 98 as before. The character is advanced out of the output shift register 98 such that the signal elements included therein appear serially at the output terminal 437 for application to the transmitting terminal station 11 over lead 29. In an idle traffic condition, therefore, either idle-alpha or idle-beta characters of the seven-unit protected telegraph code are made available at the transmitting terminal station 11 for transmission to a receiving terminal station. By noting the particular character received, an indication is provided at the receiving terminal station of the existing traffic condition.

A functional block diagram of a telegraph communication system in which the code converting circuit of the invention may find application is shown in Figure 4. The telegraph communication system shown is an automatic error correction system. The communication system includes at least two stations 1 and 2 which are electrically connected together over different electrical paths 442, 443 for two-way communication. Code characters are produced by the operation of a telegraph transmitter 444 at the first station 1 for transmission over a channel A to a transmitter unit 445. Code characters are also produced by the operation of a second telegraph transmitter 446 for transmission over a second channel B to the transmitter unit 445. Each code character transmitted over channel A and over channel B includes five signal elements arranged according to the fixed-length, five-unit telegraph code. In addition, start and other control information is forwarded to the transmitter unit 445 over the respective channels A and B.

The five-unit code characters, which may each include, for example, signal elements transmitted over the respective channels A, B in parallel form, are received in order by the transmitter unit 445 and are applied, in turn, from the transmitter unit 445 to a transmitter control unit 447 over lead 448. The transmitter control unit 447 may include a code converting circuit arranged according to the invention which functions to convert the five-unit code characters into seven-unit code characters. The converted code characters are thereafter applied from the transmitter control unit 447 back to the transmitter unit 445 over lead 449. The transmitter unit 445 is operated to transmit the converted code characters appearing on channels A, B over the electrical path 442 to the receiver unit 450 at the second station 2 in multiplex fashion. As the code characters are transmitted over the electrical path 442, equipment is provided in the transmitter unit 445 for storing on a continuous basis the last three code characters transmitted over channel A and the last three code characters transmitted over channel B.

In order to accomplish the transmission of the code characters over channels A, B, the transmitter unit 445 and transmitter control unit 447 must operate in a predetermined time sequence. Thus, the code characters are first received in order over the channels A, B by the transmitter control unit 447. The transmitter control unit 447 operates to convert the code characters and to apply the converted code characters back to the transmitter unit 445. The transmitter unit 445 thereafter operates to transmit the converted code characters in multiplex fashion over the electrical path 442. A transmitter timing unit 451 is provided which is operated in response to signal energy of a predetermined frequency applied to the transmitter timing unit 451 from a frequency standard unit 452 over lead 453. The transmitter timing unit 451 operates to produce timing signals of a predetermined frequency which are applied in a given order over leads represented by lead 454 to the transmitter unit 445 and over leads represented by lead 455 to the transmitter control unit 447. The transmitter unit 445 and transmitter control unit 447 operate in response to the timing signals to perform the functions outlined above.

The multiplex signal transmitted over the electrical path 442, which may include, for example, a radio frequency transmission system, is received by the receiver unit 450 located at the second station 2. The seven-unit code characters are applied, in turn, from the receiver unit 450 to a receiver control unit 456 over lead 457. The receiver control unit 456 converts the seven-unit code characters into five-unit code characters. Equipment is included in the receiver control unit 456 for counting the number of marking elements in each seven-unit code character received. It will be assumed for the moment that all the code characters are properly received without distortion. The converted, five-unit code characters are applied from the receiver control unit 456 back to the receiver unit 450 over lead 458. The receiver unit 450 functions to distribute the code characters transmitted over channel A to a first telegraph printer 459 and the code characters transmitted over channel B to a second telegraph printer 460.

The timing of the receiver unit 450 and of the receiver control unit 456 is controlled by a receiver timing unit 461. Signal energy is applied from a frequency standard unit 462 to a frequency correction unit 463 over lead 474. The receiver unit 450 includes equipment for producing a train of control signals of a frequency corresponding to the frequency of the signal elements included in the multiplex signal received by the receiver unit 450 over the electrical path 442. The train of control signals is applied over lead 464 to the frequency correction unit 463. Timing signals produced by the receiver timing unit 461 are also applied to the frequency correction unit 463 over a lead 465. The frequency correction unit 463 compares the frequency of the control signals received over lead 464 with the frequency of the timing signals received over lead 465. If the control signals are early compared to the timing signals, the signal energy applied from the frequency correction unit 463 to the receiver timing unit 461 over lead 466 is shifted in phase so that the timing signals produced by the operation of the receiver timing unit 461 are advanced. If the control signals are late, the timing signals are retarded. Timing signals of the proper frequency and in a given order are applied from the receiver timing unit 461 to the receiver control unit 456 over leads represented by lead 467 and to the receiver unit 450 over leads represented by lead 468. Interconnections represented by lead 469 are completed between the receiver control unit 456 and the frequency correction unit 463. Timing signals produced by the operation of the receiver control unit 456 are applied over lead 469 to the frequency correction unit 463, while timing signals produced by the operation of the frequency correction unit 463 are applied over lead 469 to the receiver control unit 456. The receiver unit 450 and the receiver control unit 456 are operated in the proper time sequence in response to the timing signals applied thereto to perform the functions outlined above.

While the above description has been directed to the equipment used to complete the transmission of code characters from the first station 1 to the second station 2, the description applies equally well, with one exception, to the equipment used to complete the transmission of code characters from the second station 2 to the first station 1. For ease of description, the corresponding equipment used to complete the transmission of message signals between the two stations 1 and 2 in the different directions has been identified by the same reference numerals, the reference numerals identifying the equipment used to complete the transmission of message signals from station 2 to station 1 being primed. Code characters produced by the operation of the telegraph transmitters 444′, 446′, as well as necessary control information, are transmitted over the respective channels A′, B′ to the transmitter unit 445. The five-unit code characters are converted into seven-unit code characters by the transmitter control unit 447′. The converted code characters are then transmitted by the operation of the transmitter unit 445 in multiplex fashion over the electrical path 443, the transmitter unit 445′ including equipment for storing on a continuous basis the last three code character transmitted over channel A′ and the last three code characters transmitted over channel B′. The multiplex signal is received by the receiver unit 450′ and the seven-unit code characters converted into five-unit code characters by the receiver control unit 456′. The converted code characters are then distributed in the proper manner over the channels A′, B′ to the telegraph printers 459′, 460′, respectively.

Up to this point, it has been assumed that the code characters in the respective multiplex signals transmitted over the electrical paths 442, 443 are received by the receiver units 450, 450′, respectively, without distortion. The operation of the stations 1, 2 without the provision for error correction to be described would be similar to that which would occur in any simple two-way communication system. If one of the code characters transmitted over channel A and received by the receiver unit 450 at the second station 2 is detected by the receiver control unit 456 as a distorted character (a code character including more than or less than three marking elements), a control signal is applied from the receiver control unit 456 to the receiver unit 450 over lead 458. The receiver unit 450 goes into cycling in response to the control signal, halting the further distribution of the code characters transmitted over channel A to the telegraph printer 459. At the same time a control signal is applied from the receiver unit 450 to the transmitter unit 445′ over lead 470. The transmitter unit 445′ interrupts the transmission of the code characters transmitted over channel A′ by the operation of the telegraph transmitter 444' and proceeds to transmit a repetition request signal plus the last three code characters transmitted over channel A' and stored by equipment in the transmitter unit 445'. The repetition request signal is detected by the receiver control unit 456', and a control signal is applied from the receiver control unit 456' to the receiver unit 450' over lead 458'. The receiver unit 450' goes into cycling and prevents the distribution of the repeated code characters transmitted over channel A' to the telegraph printer 459'. At the same time a control signal is applied from the receiver unit 450' to the transmitter unit 445 over lead 471. The transmitter unit 445 operates in response to the control signal to interrupt the transmission of the code characters produced by the telegraph transmitter 444 for transmission over channel A. The transmitter unit 445 proceeds to transmit a repetition request signal plus the last three code characters transmitted over channel A which were stored by equipment in the transmitter unit 445. The loop time delay of the error correction system is such that the code character received distorted by the the receiver unit 450 is stored in the transmitter unit 445. If the code character previously received distorted is now received correctly by the receiver unit 450, the receiver unit 450 goes out of cycling. The communication system resumes its normal condition of operation in which code characters are transmitted from the telegraph transmitter 444 to the telegraph printer 459 over channel A and in which code characters are transmitted from the telegraph transmitter 444' to the telegraph printer 459' over channel A'. If, however, the code character is again received distorted, the above sequence of operations will continue until the code character is received correctly by the receiver unit 450.

The correction of the code character received distorted by the receiver unit 450 over channel A does not affect the transmission of the code characters from the telegraph transmitter 446 to the telegraph printer 460 over channel B and from the telegraph transmitter 446' to the telegraph printer 460' over channel B'. The transmission of the code characters over the channels B, B' proceeds in the normal manner. If a code character transmitted over channel B should be received distorted by the receiver unit 450, the receiver unit 450 goes into cycling. The distorted code character is not distributed to the telegraph printer 460, and a control signal is applied from the receiver unit 450 to the transmitter unit 445' over lead 472. The transmitter unit 445' interrupts the transmission of the code characters transmitted over channel B' by the telegraph transmitter 446' and proceeds to transmit over channel B' a repetition request signal plus the last three code characters transmitted over channel B', which were stored by equipment in the transmitter unit 445'. The receiver unit 450' prevents the distribution of the repeated code characters to the telegraph printer 460', and a control signal is applied from the receiver unit 450' to the transmitter unit 445 over lead 473. The transmitter unit 445 interrupts the transmission of the code characters transmitted over channel B by the telegraph transmitter 446 and proceeds to repeat the transmission of the last three code characters transmitted over channel B. When the code character previously received distorted is received correctly, the normal transmission of code characters from the telegraph transmitter 446 to the telegraph printer 460 over channel B and from the telegraph transmitter 446' to the telegraph printer 460' over channel B' resumes. The correction of the code character transmitted over channel B and received distorted by the receiver unit 450 does not affect either the transmission of code characters from the telegraph transmitter 444 to the telegraph printer 459 over channel A or the transmission of the code characters from the telegraph transmitter 444' to the telegraph printer 459' over channel A'. The correction of a code character received distorted over one of the channels A or B proceeds independently of the correction of a code character received distorted over the other channel. The correction of a code character received distorted over channel A and of a code character received distorted over channel B may proceed at the same time following the circuit operations outlined above.

The operation of the communication system in the reverse direction to correct code characters received distorted by the receiver unit 450' over channels A' or B' is exactly the same as when code characters are received distorted by the receiver unit 450 over channels A or B. If a code character is received distorted over channel A' or B', the transmitter unit 445' is operated to repeat the code character until it is correctly received by the receiver unit 450'.

An automatic error correction system of the type described requires that one station in the system be the master, while a second station in the system be the slave. As shown in Figure 4, the first station 1 is the master station in that the transmitter timing unit 451 is operated in response to signal energy applied thereto from the frequency standard unit 452 over lead 453. The second station 2 is the slave station in that the transmitter timing unit 451' is operated in response to signal energy applied thereto from the receiving timing unit 461 over lead 465. The stations 1, 2 in the automatic error correction system must be arranged for synchronous operation to insure the proper operation of the correction loops. If the transmitting timing units 451, 451' were both operated in response to signal energy applied thereto from a different frequency standard unit, a phase difference would exist which would vary by the amount that the two frequency standard units differed in frequency. By applying the signal energy from the receiving timing unit 461 to the transmitter timing unit 451', the operation of the receiver timing unit 461 being controlled by the frequency correction unit 463, a synchronously operated system is provided.

The code converting circuit of the invention by using magnetic cores in the manner described to perform functions previously performed by other equipment is more compact and simpler in operation than circuits known heretofore. Because of these features, the circuit of the invention is valuable and readily adaptable for use in performing code conversion functions in systems, for example, of the type described in connection with Figure 4. While a single diplex or two channel multiplex telegraph communication system is shown in Figure 4, the error correction system described above, including the circuit of the invention, may be incorporated in other multiplex telegraph communication systems known in the art.

What is claimed is:

1. A code converting circuit for use in a communication system, said system having a source of signal characters each including traffic information representing the operating condition of said system and character information representing the arrangement of signal elements in a code character, said code converting circuit comprising, in combination, first and second storage circuits, means connected to said source and responsive to a received signal character from said source for storing said received signal character in one sense in said first storage circuit and in the opposite sense in said second storage circuit, a third storage circuit, connected to said first and second storage circuits, means connected to said first and second storage circuits for operating said first and said second storage circuits to produce output signals according to the traffic information included in said received signal character, means connected between said third storage circuit and both said first and said second storage circuits and responsive to said output signals for establishing a given electrical condition in said third storage circuit, means connected to said third storage circuit for operating said third storage circuit when in said electrical condition to apply a control signal to both said first and said second storage circuits, said first and second storage circuits being responsive to said control signal to each produce output signals according to the character information included in said received signal character, and an output circuit connected to and responsive to said last-mentioned output signals produced by said first and said second storage circuits.

2. A code converting circuit for use in a communication system, said system having a source of signal characters each including traffic information representing the operating condition of said system and character information representing the arrangement of signal elements in a code character, said circuit comprising, in combination, first and second magnetic core shift registers, means connected to said source and responsive to a received signal character for storing said received signal character in one sense in said first register and in the opposite sense in said second register, a group of magnetic cores connected to said first and second registers, means connected to said first and second registers for operating said first and second registers to produce output signals according to the traffic information included in said received signal character, means connected to said registers and said group of magnetic cores responsive to said output signals for establishing a given electrical condition in said group of magnetic cores, means connected to said group of magnetic cores for operating said group of magnetic cores when in said electrical condition to apply a control signal to both said first and said second registers, said first and second registers being responsive to said control signal to each produce output signals according to the character information included in said received signal character, and an output circuit connected to and responsive to said last-mentioned output signals produced by said first and second registers.

3. A code converting circuit for use in a telegraph communication system, said system having a source of signal characters each including traffic information representing the operating condition of said system and character information representing the arrangement of signal elements in a telegraph code character, said circuit comprising, in combination, first and second magnetic core shift registers, a magnetic core distributing circuit connected to said source and responsive to a received signal character for storing said received signal character in one sense in said first register and in the opposite sense in said second register, a group of magnetic cores connected to said first and second registers, driving means connected to said first and second registers for operating said first and second registers to produce output signals according to the traffic information included in said received signal character, means connected to said first and second registers and said group of magnetic cores responsive to said output signals for establishing a given electrical condition in said group of magnetic cores, a second driving means connected to said group of magnetic cores for operating said group of magnetic cores when in said electrical condition to apply a control signal to both said first and second registers, said first and second registers being responsive to said control signal to each produce output signals according to the character information included in said received signal character, and an output circuit connected to and responsive to said last-mentioned output signals produced by said first and said second registers.

4. A code converting circuit as claimed in claim 3 and wherein said first and second driving means are operated in response to timing pulses supplied by a timing wave generator.

5. A code converting circuit for use in a communication system, said system having a source of signal characters each including traffic information representing the operating condition of said system and character information representing the arrangement of signal elements in a code character, said code converting circuit comprising, in combination, first and second storage circuits, means connected to said source and responsive to a received signal character for storing said received signal character in one sense in said first storage circuit and in the opposite sense in said second storage circuit, means connected to said first and second storage circuits for operating said first and second storage circuits to produce a first group of output signals according to the traffic information included in said received signal character and a second group of output signals according to the character information included in said received signal character, a third storage circuit, a fourth storage circuit, means connected to said first and second storage circuits and responsive to said first group of output signals for establishing a first electrical condition in said third storage circuit, means connected to said first and said second storage circuits and responsive to said second group of output signals to establish a second electrical condition in said fourth storage circuit, means connected to said third storage circuit for operating said third storage circuit when in said first electrical condition to apply a control signal to said first, second and fourth storage circuits, said first and said second storage circuits being responsive to said control signal to produce a third group of output signals according to the character information included in said received signal character, said fourth storage circuit being responsive to said control signal to produce a fourth group of output signals according to said second electrical condition established therein, and an output circuit connected to said first, second and fourth storage circuits and responsive to said third and said fourth groups of output signals.

6. A code converting circuit for use in a communication system, said system having a source of signal characters each including traffic information representing the operating condition of said system and character information representing the arrangement of signal elements in a code character of a telegraph code, said circuit comprising, in combination, first and second magnetic core shift registers, a magnetic core distributing circuit connected to said source and responsive to a received signal character for storing said received signal character in one sense in said first register and in the opposite sense in said second register, first and second groups of magnetic cores, driving means connected to said first and second registers for operating said first and said second registers to produce a first group of output signals according to the traffic information included in said received signal character and a second group of output signals according to the character information included in said received signal character, means connected to said first and second registers and responsive to said first group of output signals for establishing a first electrical condition in said first group of magnetic cores, means connected to said first and second registers and responsive to said second group of output signals for establishing a second electrical condition in said second group of magnetic cores, a second driving means connected to said first group of magnetic cores for operating said first group of magnetic cores when in said first electrical condition to apply a control signal to said first and second registers and to said second group of magnetic cores, said first and second registers being responsive to said control signal to produce a third group of output signals according to the character information included in said received signal character, said second group of magnetic cores being responsive to said control signal to produce a fourth group of output signals according to said second electrical condition established therein, and an output circuit connected to said first and second registers and to said second group of magnetic cores so as to be responsive to said third and said fourth groups of output signals.

7. A code converting circuit as claimed in claim 6 and wherein said first and said second driving means are operated in response to timing pulses supplied by a timing wave generator connected to said driving means.

8. A code converting circuit as claimed in claim 6 and wherein said output circuit includes a diode matrix responsive to said third and said fourth groups of output signals to produce a conversion of said code character in the form of a corresponding code character of a second telegraph code.

9. A code converting circuit for use in a communication system, said system having a source of signal characters each including traffic information representing either an idle or a no-idle operating condition of said system, each of said signal characters also including character information representing the arrangement of signal elements in a code character when a no-idle operating condition exists, said circuit comprising, in combination, first and second storage circuits, means connected to said source and responsive to a received signal character for establishing said received signal character in one sense in said first storage circuit and in the opposite sense in said second storage circuit, a third storage circuit connected to said first and second storage circuits, means connected to said first and second storage circuits for operating said first and said second storage circuits to produce output signals according to the traffic information included in said received signal character, means connected to said first and said second storage circuits and responsive to said output signals to establish a given electrical condition in said third storage circuit, a first electrical condition being established in said third storage circuit when the traffic information included in said received signal character represents a no-idle operating condition, a second electrical condition being established in said third storage circuit when the traffic information included in said received signal character represents an idle operating condition, an output circuit connected to said first, second and third storage circuits, means connected to said third storage circuit for operating said third storage circuit when in said first electrical condition to apply a control signal to said first and said second storage circuits and when in said second electrical condition to apply output signals indicating the idle operating condition of said system to said output circuit, said first and said second storage circuits being responsive to said control signal to apply output signals according to the character information included in said received signal character to said output circuit.

10. A code converting circuit for use in a communication system, said system having a source of signal characters each including traffic information representing either an idle or a no-idle operating condition of said system, each of said signal characters also including character information representing the arrangement of signal elements in a code character when a no-idle operating condition exists, said circuit comprising, in combination, first and second magnetic core shift registers, means connected to said source and responsive to a received signal character for storing said received signal character in one sense in said first register and in the opposite sense in said second register, a storage circuit connected to said registers, means connected to said first and second registers for operating said first and said second registers to produce output signals according to the traffic information included in said received signal character, means connected to said first and said second registers and responsive to said output signals to establish a given electrical condition in said storage circuit, a first electrical condition being established in said storage circuit when the traffic information included in said received signal character represents a no-idle operating condition, a second electrical condition being established in said storage circuit when the traffic information included in said received signal character represents an idle operating condition, an output circuit connected to said first and second registers and to said storage circuit, means connected to said storage circuit for operating said storage circuit when in said first electrical condition to apply a control signal to said first and second registers and when in said second electrical condition to apply output signals indicating the idle operating condition of said system to said output circuit, said first and said second registers being responsive to said control signal to apply output signals according to the character information included in said received signal character to said output circuit.

11. A code converting circuit for use in a communication system, said system having a source of signal characters each including traffic information representing either an idle or a no-idle operating condition of said system, each of said signal characters also including character information representing the arrangement of signal elements in a code character when a no-idle operating condition exists, said circuit comprising, in combination, first and second magnetic core shift registers, a magnetic core distributing circuit connected to said source and responsive to a received signal character for storing said received signal character in one sense in said first register and in the opposite sense in said second register, a group of magnetic cores, driving means connected to said first and second registers for operating said first and said second registers to produce output signals according to the traffic information included in said received signal character, means connected to said first and said second registers and responsive to said output signals to establish a given electrical condition in said group of magnetic cores, a first electrical condition being established in said group of magnetic cores when the traffic information included in said received signal character represents a no-idle operating condition, a second electrical condition being established in said group of magnetic cores when the traffic information included in said received signal character represents an idle operating condition, an output circuit connected to said first and second registers and to said group of magnetic cores, a second driving means connected to said group of magnetic cores for operating said group of magnetic cores when in said first electrical condition to apply a control signal to said first and second registers and when in said second electrical condition to apply output signals indicating the idle operating condition of said system to said output circuit, said first and said second registers being responsive to said control signal to apply output signals according to the character information included in said received signal character to said output circuit.

12. A code converting circuit as claimed in claim 11 and wherein said first and said second driving means are operated in response to timing pulses supplied by a timing wave generator connected to said driving means.

13. A code converting circuit for use in a communication system, said system having a source of signal characters each including traffic information representing either an idle or a no-idle operating condition of said system, each of said signal characters also including character information representing the arrangement of signal elements in a code character when a no-idle operating condition exists, said circuit comprising, in combination, first and second storage circuits, means connected to said source and responsive to a received signal character for storing said received signal character in one sense in said first storage circuit and in the opposite sense in said second storage circuit, third and fourth storage circuits, means connected to said first and second storage circuits for operating said first and said second storage circuits to produce a first group of output signals according to the traffic information included in said received signal character and to produce a second group of output signals according to the character information included in said received signal character, means connected to said first and said second storage circuits and responsive to said first group of output signals to establish a given electrical condition in said third storage circuit, a first electrical condition being established in said third storage circuit when the traffic information included in said received signal character represents a no-idle operating condition, a second electrical condition being established in said third storage circuit when the traffic information included in said received signal character represents an idle operating condition, means connected to said first and said second storage circuits and responsive to said second group of output signals to establish a third electrical condition in said fourth storage circuit, an output circuit connected to said first, second, third and fourth storage circuits, means connected to said third storage circuit for operating said third storage circuit when in said first electrical condition to apply a control signal to said first, second and fourth storage circuits and when in said second electrical condition to apply output signals indicating the idle operating condition of said system to said output circuit, said first and said second storage circuits being responsive to said control signal to apply a third group of output signals according to the character information included in said received signal character to said output circuit, said fourth storage circuit being responsive to said control signal to apply a fourth group of output signals according to said third electrical condition established therein to said output circuit.

14. A code converting circuit for use in a telegraph communication system, said system having a source of signal characters each including traffic information representing either an idle or a no-idle operating condition of said system, each of said signal characters also including character information representing the arrangement of signal elements in a code character of a telegraph code when a no-idle operating condition exists, said circuit comprising, in combination, first and second magnetic core shift registers, a magnetic core distributing circuit connected to said source and responsive to a received signal character for storing said received signal characters in one sense in said first register and in the opposite sense in said second register, first and second groups of magnetic cores, driving means connected to said first and second registers for operating said first and said second registers to produce a first group of output signals according to the traffic information included in said received signal character and upon said received signal character including character information to produce a second group of output signals according to the character information included in said received signal character, means connected to said first and said second registers and responsive to said first group of output signals to establish a given electrical condition in said first group of magnetic cores, a first electrical condition being established in said first group of magnetic cores when the traffic information included in said received signal character represents a no-idle operating condition, a second electrical condition being established in said first group of magnetic cores when the traffic information included in said received signal character represents an idle operating condition, means connected to said first and said second registers and responsive to said second group of output signals to establish a third electrical condition in said second group of magnetic cores, an output circuit connected to both said first and said second registers and to both said first and said second groups of magnetic cores, a second driving means connected to said first group of magnetic cores for operating said first group of magnetic cores when in said first electrical condition to apply a control signal to both said first and said second registers and to said second group of magnetic cores and when in said second electrical condition to apply output signals indicating the idle operating condition of said system to said output circuit, said first and said second registers being responsive to said control signal to apply a third group of output signals according to the character information included in said received signal character to said output circuit, said second group of magnetic cores being responsive to said control signal to apply a fourth group of output signals according to said third electrical condition established therein to said output circuit.

15. A code converting circuit as claimed in claim 14 and wherein said first and said second driving means are operated in response to timing pulses supplied by a timing wave generator connected to said driving means.

16. A code converting circuit as claimed in claim 14 and wherein said output circuit includes a diode matrix responsive to said third and said fourth groups of output signals to produce a conversion of said code character in the form of a corresponding code character of a second telegraph code, said matrix being responsive to the output signals applied thereto from said first group of magnetic cores to produce a predetermined code character of said second telegraph code.

17. A code converting arrangement for use in a communication system having a source of signal characters, each of said signal characters including traffic information representing the operating condition of said system and when code characters are to be forwarded over said system character information representing the arrangement of signal elements in a code character, said circuit comprising, in combination, first and second storage circuits coupled to said source and arranged to be operated to cause a received signal character to be stored in one sense in said first storage circuit and in the opposite sense in said second storage circuit, a third storage circuit connected to said first and second storage circuits and responsive to the traffic information stored in said first and second storage circuits when said system is in operation to produce a control signal, means connected between said first, second and third storage circuits to apply said control signal to said first and second storage circuits, said first and second storage circuits being responsive to said control signal to each produce output signals according to the character information included in said received signal character stored in said first and second storage circuits, and an output circuit connected to said first and second storage circuits and responsive to said output signals produced thereby.

18. A code converting circuit for use in a communication system having a source of signal characters, each of said signal characters including traffic information representing the operating condition of said system and character information representing the arrangement of elements of a character in a first code when characters of said first code are to be forwarded over said system, said circuit comprising, in combination, a storage circuit connected to said source and operated to store a received signal character in binary form, a second storage circuit connected to said first storage circuit and responsive to the traffic information in said received signal character stored in said first storage circuit so that a given electrical condition is established therein, a first electrical condition being established in said second storage circuit when the traffic information in said stored received signal character indicates that said system is in an idle operating condition, a second electrical condition being established in said second storage circuit when the traffic information in said stored received signal character indicates that said system is in operation to forward the characters of said first code, a third storage circuit connected to said first storage circuit and responsive to the character information in said stored received signal character when said system is in operation so that a third electrical condition is established in said third storage circuit, a code converting circuit connected to said first, second and third storage circuits, means connected to said second storage circuit for operating said second storage circuit when in said second condition to apply a control signal to said first and third storage circuits and when in said first condition to apply output signals indicating the idle operating condition of said system to said code converting circuit, said first storage circuit being responsive to said control signal to apply output signals according to the character information included in said stored received signal character to said code converting circuit, said third storage circuit being responsive to said control signal to apply output signals according to said third electrical condition to said code converting circuit, said code converting circuit being responsive to the output signals applied thereto from said first and third storage circuits to produce a character of a second code corresponding to said character of said first code included in said received signal character, said code converting circuit being responsive to the output signals applied thereto from said second storage circuit to produce a predetermined character of said second code, and an output circuit connected to said code converting circuit and responsive to the characters of said second code produced thereby.

19. A code converting circuit as claimed in claim 14 and wherein said means to establish said third electrical condition in said second group of magnetic cores includes a plurality of grouping circuits.

20. A code converting arrangement as claimed in claim 18, wherein said characters in said first code are fixed-length, five-unit code characters, said code converting circuit including a diode matrix responsive to the output signals of said first and third storage circuits to produce a corresponding character of the fixed-length, seven-unit protected code, said matrix being responsive to the output signals of said second storage circuit to produce a predetermined character of said seven-unit protected code.

No references cited.